(12) United States Patent
Yamaga et al.

(10) Patent No.: US 11,741,991 B2
(45) Date of Patent: Aug. 29, 2023

(54) MAGNETIC RECORDING MEDIUM

(71) Applicant: Sony Corporation, Tokyo (JP)

(72) Inventors: Minoru Yamaga, Miyagi (JP); Takanobu Iwama, Miyagi (JP); Jun Takahashi, Miyagi (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 16/969,678

(22) PCT Filed: Nov. 19, 2018

(86) PCT No.: PCT/JP2018/042739
§ 371 (c)(1),
(2) Date: Aug. 13, 2020

(87) PCT Pub. No.: WO2019/159466
PCT Pub. Date: Aug. 22, 2019

(65) Prior Publication Data
US 2021/0012800 A1    Jan. 14, 2021

(30) Foreign Application Priority Data
Feb. 16, 2018  (JP) .................................. 2018-026527

(51) Int. Cl.
*G11B 5/706* (2006.01)
*G11B 5/71* (2006.01)
(Continued)

(52) U.S. Cl.
CPC ........ *G11B 5/70678* (2013.01); *G11B 5/5928* (2013.01); *G11B 5/71* (2013.01); *G11B 5/714* (2013.01)

(58) Field of Classification Search
CPC ..... G11B 5/5928; G11B 5/70678; G11B 5/71; G11B 5/714; G11B 5/7022; G11B 5/733; G11B 5/7358; G11B 5/78
See application file for complete search history.

(56) References Cited

U.S. PATENT DOCUMENTS 7,910,234 B2 * 3/2011 Brodd ...................... G11B 5/84
428/840
2006/0274446 A1 * 12/2006 Johnson .................. G11B 5/584
360/77.12
(Continued)

FOREIGN PATENT DOCUMENTS

JP   H06195687 A    7/1994
JP   2006065953 A   3/2006
(Continued)

OTHER PUBLICATIONS

English Machine Translation: Nagata et al. (JP 2007-294086).*
International Search Report issued in Application No. PCT/JP2018/042739, dated Jan. 29, 2019.

*Primary Examiner* — Holly Rickman
*Assistant Examiner* — Linda N Chau
(74) *Attorney, Agent, or Firm* — K&L Gates LLP

(57) ABSTRACT

A tape-shaped magnetic recording medium is provided with a base, an underlayer provided on the base, and a magnetic layer provided on the underlayer including magnetic powder including hexagonal ferrite. The underlayer and the magnetic layer include lubricant. The magnetic layer includes a surface provided with a large number of holes, and arithmetic average roughness Ra of the surface is 2.5 nm or smaller. A BET specific surface area of a whole of the magnetic recording medium in a state in which the lubricant is removed is 3.5 $m^2$/mg or larger. A square ratio in a vertical direction is 65% or larger, an average thickness of the magnetic layer is 90 nm or smaller, and an average thickness of the magnetic recording medium is 5.6 μm or smaller.

18 Claims, 5 Drawing Sheets

(51) Int. Cl.
    *G11B 5/592*    (2006.01)
    *G11B 5/714*    (2006.01)

(56) References Cited

U.S. PATENT DOCUMENTS

| | | |
|---|---|---|
| 2007/0231611 A1 | 10/2007 | Masaki |
| 2007/0254190 A1 | 11/2007 | Brodd et al. |
| 2009/0046396 A1 | 2/2009 | Nagata et al. |
| 2012/0314322 A1* | 12/2012 | Olson ................ G11B 5/00821 360/77.12 |
| 2013/0063836 A1 | 3/2013 | Bui et al. |
| 2016/0322076 A1 | 11/2016 | Mori |
| 2017/0162220 A1 | 6/2017 | Nakashio et al. |

FOREIGN PATENT DOCUMENTS

| | | |
|---|---|---|
| JP | 2007265547 A | 10/2007 |
| JP | 2007294074 A | 11/2007 |
| JP | 2007294086 A | 11/2007 |
| JP | 2007299513 A | 11/2007 |
| JP | 2016212932 A | 12/2016 |
| WO | 2015198514 A1 | 12/2015 |
| WO | WO-2015198514 A | 12/2015 |

\* cited by examiner

MAGNETIC RECORDING MEDIUM

TECHNICAL FIELD

The present disclosure relates to a magnetic recording medium.

BACKGROUND ART

Tape-shaped magnetic recording media are widely used for storage of electronic data. Patent Document 1 discloses that a surface of a magnetic layer is smoothed in order to improve an electromagnetic conversion characteristic of the magnetic recording medium. Furthermore, in this document, it is disclosed that lubricant is added to the magnetic layer in order to suppress friction due to contact between the magnetic recording medium and a head.

CITATION LIST

Patent Document

Patent Document 1: Japanese Patent Application Laid-Open No. 2006-65953

SUMMARY OF THE INVENTION

Problems to be Solved by the Invention

However, when the surface of the magnetic layer is smoothed, it becomes difficult to stably supply the lubricant between the magnetic recording medium and the head after repeated recording or reproduction, which might increase a dynamic friction coefficient.

An object of the present disclosure is to provide a magnetic recording medium capable of suppressing an increase in dynamic friction coefficient even after repeated recording or reproduction.

Solutions to Problems

In order to solve the above-described problems, the present disclosure is a tape-shaped magnetic recording medium including a base, an underlayer provided on the base, and a magnetic layer provided on the underlayer and including magnetic powder including hexagonal ferrite, in which the underlayer and the magnetic layer include lubricant, the magnetic layer includes a surface provided with a large number of holes, arithmetic average roughness Ra of the surface is 2.5 nm or smaller, a BET specific surface area of a whole of the magnetic recording medium in a state in which the lubricant is removed is 3.5 m$^2$/mg or larger, a square ratio in a vertical direction is 65% or larger, an average thickness of the magnetic layer is 90 nm or smaller, and an average thickness of the magnetic recording medium is 5.6 μm or smaller.

Effects of the Invention

According to the present disclosure, it is possible to suppress the increase in dynamic friction coefficient even after the repeated recording or reproduction. Note that, the effects herein described are not necessarily limited and may be any of the effects described in the present disclosure or other effects.

MODE FOR CARRYING OUT THE INVENTION

Embodiments of the present technology are described in the following order.

1 Configuration of Magnetic Recording Medium
2 Method of Manufacturing Magnetic Recording Medium
3 Configuration of Recording/reproducing Device>
4 Effect
5 Variation

[1 Configuration of Magnetic Recording Medium]

Figure 1:
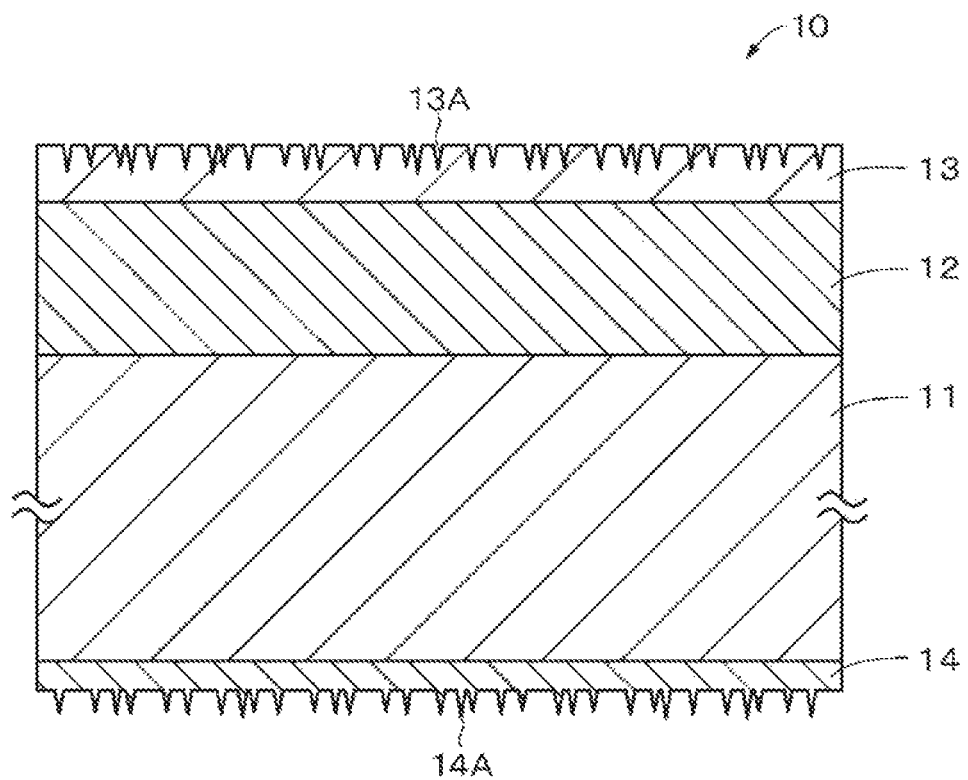
FIG. 1 is a cross-sectional view of a magnetic recording medium according to one embodiment.

First, a configuration of a magnetic recording medium 10 according to one embodiment is described with reference to FIG. 1. The magnetic recording medium 10 is provided with an elongated base 11, an underlayer 12 provided on one main surface of the base 11, a magnetic layer 13 provided on the underlayer 12, and a back layer 14 provided on the other main surface of the base 11. A surface of the magnetic layer 13 is a surface on which a magnetic head travels. Note that the underlayer 12 and the back layer 14 are provided as necessary and they are not necessarily provided.

The magnetic recording medium 10 having an elongated tape shape is allowed to travel in a longitudinal direction at the time of recording and reproduction. The magnetic recording medium 10 is preferably used in a recording/reproducing device provided with a ring head as a recording head.

(Base)

The base 11 is a nonmagnetic supporting body which supports the underlayer 12 and the magnetic layer 13. The base 11 has an elongated film shape. An upper limit value of an average thickness of the base 11 is preferably 4.2 μm or smaller, more preferably 3.8 μm or smaller, and still more preferably 3.4 μm or smaller. When the upper limit value of the average thickness of the base 11 is 4.2 μm or smaller, a recording capacity which may be recorded in one data cartridge may be increased as compared with that in a general magnetic recording medium. A lower limit value of the average thickness of the base 11 is preferably 3 μm or larger, and more preferably 3.2 μm or larger. When the lower limit value of the average thickness of the base 11 is 3 μm or larger, reduction in strength of the base 11 may be suppressed.

The average thickness of the base 11 is obtained as follows. First, the magnetic recording medium 10 having a width of ½ inch is prepared, and this cut into a length of 250 mm to fabricate a sample. Subsequently, layers other than the base 11 of the sample (that is, the underlayer 12, the magnetic layer 13, and the back layer 14) are removed by a solvent such as methyl ethyl ketone (MEK) or dilute hydrochloric acid. Next, a thickness of the sample (base 11) is measured in five or more positions using a laser holo gauge manufactured by Mitsutoyo as a measuring device, and simply averages (arithmetically averages) the measured values to calculate the average thickness of the base 11. Note that the measurement positions are selected at random from the sample.

The base 11 includes, for example, at least one of polyesters, polyolefins, cellulose derivatives, vinyl resins, or other polymer resins. In a case where the base 11 includes two or more of the above-described materials, the two or more materials may be mixed, copolymerized, or laminated.

The polyesters includes at least one of, for example, polyethylene terephthalate (PET), polyethylene naphthalate (PEN), polybutylene terephthalate (PBT), polybutylene naphthalate (PBN), polycyclohexylenedimethylene terephthalate (PCT), polyethylene-p-oxybenzoate (PEB), or polyethylene bisphenoxycarboxylate.

The polyolefins include, for example, at least one of polyethylene (PE) or polypropylene (PP). The cellulose derivatives include, for example, at least one of cellulose diacetate, cellulose triacetate, cellulose acetate butyrate (CAB), or cellulose acetate propionate (CAP). The vinyl resins include, for example, at least one of polyvinyl chloride (PVC) or polyvinylidene chloride (PVDC), for example.

Other polymer resins include, for example, at least one of polyamide, (PA, nylon), aromatic polyamide (aromatic PA, aramid), polyimide (PI), aromatic polyimide (aromatic PI), polyamide imide (PAI), aromatic polyamide imide (aromatic PAI), polybenzoxazole (PBO, for example, ZYLON (registered trademark)), polyether, polyether ketone (PEK), polyether ester, polyether sulfone (PES), polyether imide (PEI), polysulfone (PSF), polyphenylene sulfide (PPS), polycarbonate (PC), polyarylate (PAR), or polyurethane (PU).

(Magnetic Layer)

The magnetic layer 13 is a recording layer for recording a signal. The magnetic layer 13 includes, for example, magnetic powder, a binder, and lubricant. The magnetic layer 13 may further include an additive such as a conductive particle, an abrasive, or a rust inhibitor, as necessary.

The magnetic layer 13 includes a surface provided with a large number of holes 13A. The lubricant is stored in the large number of holes 13A. The large number of holes 13A preferably extend in a direction perpendicular to the surface of the magnetic layer 13. This is because a supply property of the lubricant to the surface of the magnetic layer 13 may be improved. Note that, it is also possible that a part of the large number of holes 13A is extended perpendicularly.

Arithmetic average roughness Ra of the surface of the magnetic layer 13 is 2.5 nm or smaller, preferably 2.2 nm or smaller, more preferably 1.9 nm or smaller. When the arithmetic average roughness Ra is 2.5 nm or smaller, an excellent electromagnetic conversion characteristic may be obtained. A lower limit value of the arithmetic average roughness Ra of the surface of the magnetic layer 13 is preferably 1.0 nm or larger, more preferably 1.2 nm or larger, and still more preferably 1.4 nm or larger. When the lower limit value of the arithmetic average roughness Ra of the surface of the magnetic layer 13 is 1.0 nm or larger, it is possible to suppress a decrease in traveling performance due to an increase in friction.

The above-described arithmetic average roughness Ra is obtained as follows. First, the surface of the magnetic layer 13 is observed using an atomic force microscope (AFM) (manufactured by Bruker, Dimension Icon) to obtain a cross-sectional profile. Next, the arithmetic average roughness Ra is obtained from the obtained cross-sectional profile in accordance with JIS B0601:2001.

A lower limit value of a BET specific surface area of a whole of the magnetic recording medium 10 in a state in which the lubricant is removed is 3.5 m$^2$/mg or larger, preferably 4 m$^2$/mg or larger, more preferably 4.5 m$^2$/mg or larger, and still more preferably 5 m$^2$/mg or larger. When the lower limit value of the BET specific surface area is 3.5 m$^2$/mg or larger, it is possible to suppress a decrease in supply amount of the lubricant between the surface of the magnetic layer 13 and the magnetic head even after repeated recording or reproduction is performed (that is, even after the magnetic head is brought into contact with the surface of the magnetic recording medium 10 to repeatedly travel). Therefore, an increase in dynamic friction coefficient may be suppressed.

An upper limit value of the BET specific surface area of the whole of the magnetic recording medium 10 in the state in which the lubricant is removed is preferably 7 m$^2$/mg or smaller, more preferably 6 m$^2$/mg or smaller, and still more preferably 5.5 m$^2$/mg or smaller. When the upper limit value of the BET specific surface area is 7 m$^2$/mg or smaller, the lubricant may be sufficiently supplied without being depleted even after a large number of times of travel. Therefore, an increase in dynamic friction coefficient may be suppressed.

An average pore diameter of the whole of the magnetic recording medium 10 obtained by a BJH method is 6 nm or larger and 11 nm or smaller, preferably 7 nm or larger and 10 nm or smaller, and more preferably 7.5 nm or larger and 10 nm or smaller. When the average pore diameter is 6 nm or larger and 11 nm or smaller, an effect of suppressing the increase in dynamic friction coefficient described above may be further improved.

The BET specific surface area and pore distribution (pore volume, pore diameter of maximum pore volume at desorption) are obtained as follows. First, the magnetic recording medium 10 is washed with hexane for 24 hours, and then cut into a size with an area of 0.1265 m$^2$ to manufacture a measurement sample. Next, the BET specific surface area is obtained using a specific surface area/pore distribution measuring device. Furthermore, the pore distribution (pore volume, pore diameter of maximum pore volume at desorption) is obtained by the BJH method. A measuring device and a measuring condition are described below.

Measuring Device: 3FLEX manufactured by Micromeritics

Measured Adsorbate: N2 gas

Measurement pressure range (p/p0): 0 to 0.995

Figure 2:
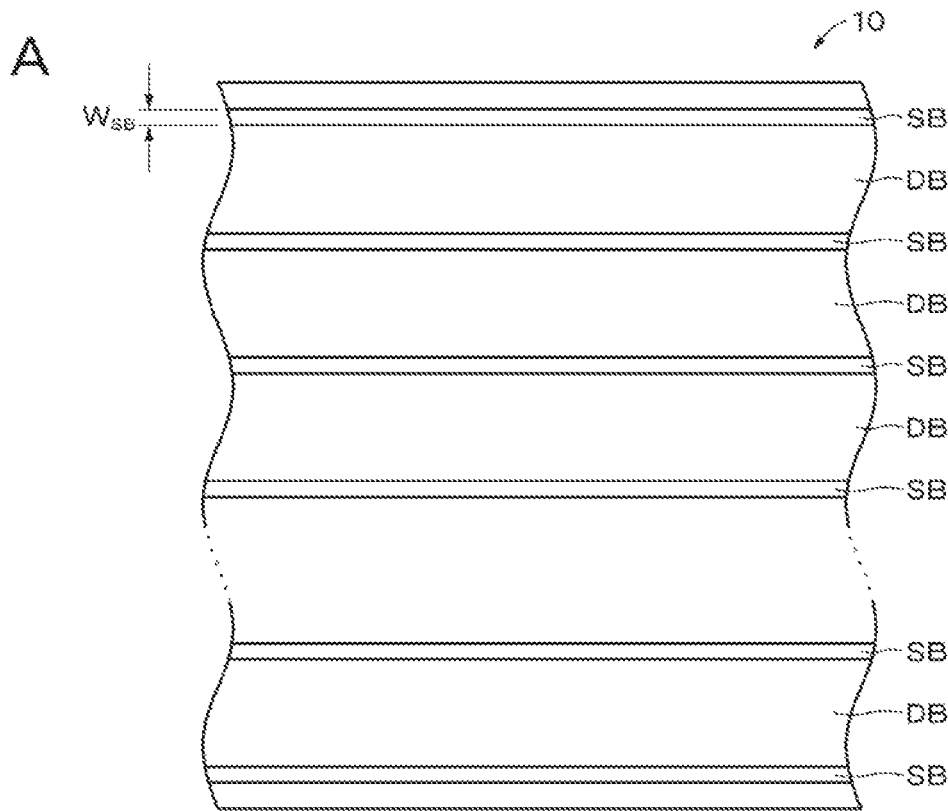
FIG. 2A is a schematic diagram of a layout of data bands and servo bands.
FIG. 2B is an enlarged view of the data band.
Figure 2:
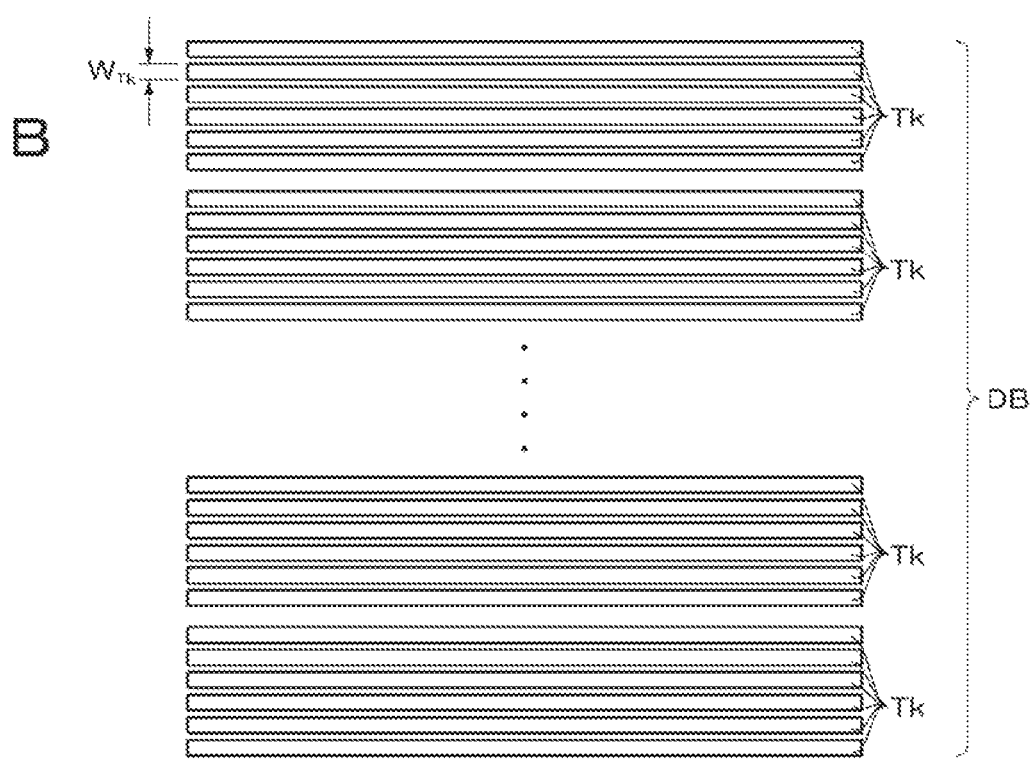

The magnetic layer 13 preferably includes a plurality of servo bands SB and a plurality of data bands DB in advance as illustrated in FIG. 2A. The plurality of servo bands SB is provided at equal intervals in a width direction of the magnetic recording medium 10. The data band DB is provided between the adjacent servo bands SB. In the servo band SB, a servo signal for performing tracking control on the magnetic head is written in advance. User data is recorded in the data band DB.

An upper limit value of a ratio $R_S(=(S_{SB}/S)\times100)$ of a total area $S_{SB}$ of the servo bands SB to an area S of the surface of the magnetic layer 13 is preferably 4.0% or smaller, more preferably 3.0% or smaller, and still more preferably 2.0% or smaller from a viewpoint of securing a high recording capacity. On the other hand, a lower limit value of the ratio $R_S$ of the total area $S_{SB}$ of the servo bands SB to the area S of the surface of the magnetic layer 13 is preferably 0.8% or larger from a viewpoint of securing five or more servo tracks.

The ratio $R_S$ of the total area $S_{SB}$ of the servo bands SB to the area S of the surface of the magnetic layer 13 is obtained as follows. First, the surface of the magnetic layer 13 is observed using a magnetic force microscope (MFM) to obtain an MFM image. Subsequently, a servo band width $W_{SB}$ and the number of servo bands SB are measured by using the obtained MFM image. Next, the ratio $R_S$ is obtained from the following equation.

Ratio $R_S$[%]=(((servo band width $W_{SB}$)×(number of servo bands))/(width of magnetic recording medium 10))×100

The number of servo bands SB is preferably five or larger, more preferably 5+4n (where n is a positive integer) or larger. When the number of servo bands SB is five or larger, an effect of a dimensional change in the width direction of the magnetic recording medium 10 on the servo signal is suppressed, and a stable recording/reproducing characteristic with smaller off-track may be secured.

An upper limit value of the servo band width $W_{SB}$ is preferably 95 µm or smaller, more preferably 60 µm or smaller, and still more preferably 30 µm or smaller from a viewpoint of securing the high recording capacity. A lower limit value of the servo band width $W_{SB}$ is preferably 10 µm or larger from a viewpoint of manufacturing the recording head. A width of the servo band width $W_{SB}$ may be obtained as follows. First, the surface of the magnetic layer 13 is observed using the magnetic force microscope (MFM) to obtain the MFM image. Next, the width of the servo band width $W_{SB}$ is measured using the MFM image.

The magnetic layer 13 is configured to be able to form a plurality of data tracks Tk in the data band DB, as illustrated in FIG. 2B. In this case, an upper limit value of a data track width $W_{Tk}$ is preferably 2.0 µm or smaller, more preferably 1.5 µm or smaller, and still more preferably 1.0 µm or smaller from a viewpoint of securing the high recording capacity. A lower limit value of the data track width $W_{Tk}$ is preferably 0.02 µm or larger from a viewpoint of a magnetic particle size.

The magnetic layer 13 is configured to be able to record the data so that a minimum value of a magnetization inversion distance L is preferably 48 nm or smaller, more preferably 44 nm or smaller, and still more preferably 40 nm or smaller from a viewpoint of securing the high recording capacity. A lower limit value of the minimum value of the magnetization inversion distance L is preferably 20 nm or larger from a viewpoint of the magnetic particle size.

An upper limit value of an average thickness of the magnetic layer 13 is preferably 90 nm or smaller, especially preferably 80 nm or smaller, more preferably 70 nm or smaller, and still more preferably 50 nm or smaller. When the upper limit value of the average thickness of the magnetic layer 13 is 90 nm or smaller, magnetization may be recorded uniformly in a thickness direction of the magnetic layer 13 in a case where the ring head is used as the recording head, so that the electromagnetic conversion characteristic may be improved.

A lower limit value of the average thickness of the magnetic layer 13 is preferably 35 nm or larger. When the upper limit value of the average thickness of the magnetic layer 13 is 35 nm or larger, an output may be secured in a case where an MR head is used as the recording head, so that the electromagnetic conversion characteristic may be improved.

The average thickness of the magnetic layer 13 may be obtained as follows. First, the magnetic recording medium 10 is thinly processed perpendicularly to a main surface thereof to produce a sample piece, and a cross-section of the sample piece is observed with a transmission electron microscope (TEM). A device and an observation condition are described below.

Device: TEM (H9000NAR manufactured by Hitachi, Ltd.)
Acceleration voltage: 300 kV
Magnification: 100,000 times Next, the thickness of the magnetic layer 13 is measured in at least 10 or larger positions in the longitudinal direction of the magnetic recording medium 10 using the obtained TEM image, and thereafter measured values are simply averaged (arithmetically averaged) to obtain the average thickness of the magnetic layer 13. Note that, the measurement positions are selected at random from the sample piece.

(Magnetic Powder)

The magnetic powder includes powder of a nanoparticle containing ε-iron oxide (hereinafter referred to as "ε-iron oxide particle"). An ε-iron oxide particle may obtain high coercive force even when this is a fine particle. ε-iron oxide included in the ε-iron oxide particle is preferably crystal-oriented preferentially in the thickness direction of the magnetic recording medium 10 (vertical direction).

ε-iron oxide particle has a spherical shape or a substantially spherical shape, or has a cubic shape or a substantially cubic shape. Since the ε-iron oxide particle has the above-described shape, in a case where the ε-iron oxide particle is used as the magnetic particle, a contact area between the particles in the thickness direction of the magnetic recording medium 10 may be reduced and aggregation of the particles may be suppressed as compared with a case where a hexagonal plate-shaped barium ferrite particle is used as the magnetic particle. Therefore, dispersibility of the magnetic powder may be enhanced and a more excellent signal-to-noise ratio (SNR) may be obtained.

Figure 3:
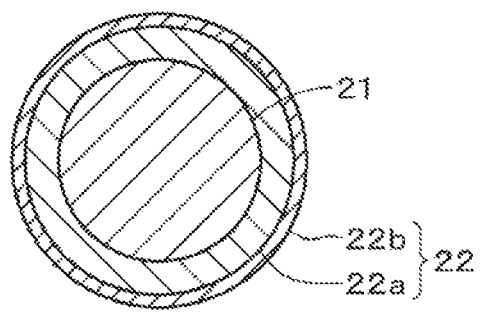
FIG. 3 is a cross-sectional view of a magnetic particle.

The ε-iron oxide particle has a core-shell structure. Specifically, as illustrated in FIG. 3, the ε-iron oxide particle is provided with a core 21 and a shell 22 having a two-layer structure provided around the core 21. The shell 22 having the two-layer structure is provided with a first shell 22a provided on the core 21 and a second shell 22b provided on the first shell 22a.

The core 21 includes ε-iron oxide. ε-iron oxide included in the core 21 preferably includes a ε-$Fe_2O_3$ crystal as a main phase, and more preferably includes a single-phase ε-$Fe_2O_3$.

The first shell 22a covers at least a part of a periphery of the core 21. Specifically, the first shell 22a may partially cover the periphery of the core 21 or may cover an entire periphery of the core 21. From a viewpoint of making exchange coupling between the core 21 and the first shell 22a sufficient and improve a magnetic characteristic, the entire surface of the core 21 is preferably covered.

The first shell 22a is a so-called soft magnetic layer, and includes, for example, a soft magnetic material such as α-Fe, a Ni—Fe alloy, or a Fe—Si—Al alloy. α-Fe may also be obtained by reducing ε-iron oxide included in the core 21.

The second shell 22b is an oxide coating as an oxidation resistant layer. The second shell 22b includes α-iron oxide, aluminum oxide, or silicon oxide. α-iron oxide includes at least one iron oxide among $Fe_3O_4$, $Fe_2O_3$, or FeO, for example. In a case where the first shell 22a includes α-Fe (soft magnetic material), α-iron oxide may be obtained by oxidizing α-Fe included in the first shell 22a.

Since the ε-iron oxide particle has the first shell 22a as described above, it is possible to adjust the coercive force Hc as whole ε-iron oxide particles (core-shell particles) to the coercive force Hc suitable for recording while keeping a large value of the coercive force Hc of the core 21 alone for securing thermal stability. Furthermore, since the ε-iron oxide particle has the second shell 22b as described above, it is possible to suppress a decrease in characteristic of the ε-iron oxide particle due to exposure of the ε-iron oxide particle to the air and occurrence of rust and the like on a particle surface at a manufacturing step of the magnetic recording medium 10 and before the step. Therefore, deterioration in characteristic of the magnetic recording medium 10 may be suppressed.

The average particle size (average maximum particle size) of the magnetic powder is preferably 22 nm or smaller, more preferably 8 nm or larger and 22 nm or smaller, and still more preferably 12 nm or larger and 22 nm or smaller. In the magnetic recording medium 10, a region of half a recording wavelength is an actual magnetization region. For this reason, an excellent S/N may be obtained by setting the average particle size of the magnetic powder to half or smaller of a shortest recording wavelength. Therefore, when the average particle size of the magnetic powder is 22 nm or smaller, in the magnetic recording medium 10 of high recording density (for example, the magnetic recording medium 10 configured to be able to record a signal at the shortest recording wavelength of 44 nm or shorter), the excellent electromagnetic conversion characteristic (for example, SNR) may be obtained. On the other hand, when the average particle size of the magnetic powder is 8 nm or larger, the dispersibility of the magnetic powder is further improved, and more excellent electromagnetic conversion characteristic (for example, SNR) may be obtained.

An average aspect ratio of the magnetic powder is preferably 1 or larger and 2.5 or smaller, more preferably 1 or larger and 2.1 or smaller, and still more preferably 1 or larger and 1.8 or smaller. When the average aspect ratio of the magnetic powder is in a range of 1 or larger and 2.5 or smaller, aggregation of the magnetic powder may be suppressed, and it is possible to suppress resistance applied to the magnetic powder when the magnetic powder is vertically oriented at a step of forming the magnetic layer 13. Therefore, vertical orientation of the magnetic powder may be improved.

The average particle size and the average aspect ratio of the magnetic powder described above are obtained as follows. First, the magnetic recording medium 10 to be measured is processed by a focused ion beam (FIB) method or the like to fabricate a laminate, and a cross-section of the laminate is observed by the TEM. Next, 50 ε-iron oxide particles are randomly selected from the taken TEM photograph, and a long axis length DL and a short axis length DS of each ε-iron oxide particle are measured. Here, the long axis length DL means the largest one of the distances between the two parallel lines drawn from all angles so as to be in contact with a contour of the ε-iron oxide particle (so-called maximum Feret's diameter). On the other hand, the short axis length DS means the largest one of the lengths of the ε-iron oxide particle in a direction orthogonal to a long axis of the ε-iron oxide particle.

Subsequently, the measured long axis lengths DL of the 50 ε-iron oxide particles are simply averaged (arithmetically averaged) to obtain an average long axis length DLave. The average long axis length DLave obtained in this manner is made the average particle size of the magnetic powder. Furthermore, the measured short axis lengths DS of the ten ε-iron oxide particles are simply averaged (arithmetically averaged) to obtain an average short axis length DSave. Then, the average aspect ratio (DLave/DSave) of the ε-iron oxide particles is obtained from the average long axis length DLave and the average short axis length DSave.

An average particle volume of the magnetic powder is preferably 5500 nm$^3$ or smaller, more preferably 270 nm$^3$ or larger and 5500 nm$^3$ or smaller, and still more preferably 900 nm$^3$ or larger and 5500 nm$^3$ or smaller. When the average particle volume of the magnetic powder is 5500 nm$^3$ or smaller, an effect similar to that in a case where the average particle size of the magnetic powder is 22 nm or smaller may be obtained. On the other hand, when the average particle volume of the magnetic powder is 270 nm$^3$ or larger, an effect similar to that in a case where the average particle size of the magnetic powder is 8 nm or larger may be obtained.

In a case where the ε-iron oxide particle is spherical or substantially spherical, the average particle volume of the magnetic powder is obtained as follows. First, the average long axis length DLave is obtained in a manner similar to the above-described method of calculating the average particle size of the magnetic powder. Next, an average volume V of the magnetic powder is obtained by the following equation.

$$V=(\pi/6)\times DLave^3$$

In a case where the ε-iron oxide particle has the cubic shape or the substantially cubic shape, the average volume of the magnetic powder is obtained as follows. First, the average long axis length DLave is obtained in a manner similar to the above-described method of calculating the average particle size of the magnetic powder. Next, an average volume V of the magnetic powder is obtained by the following equation:

$$V=DLave^3.$$

(Binder)

As the binder, a resin having a structure in which a crosslinking reaction is imparted to a polyurethane resin, a vinyl chloride resin or the like is preferable. However, the binder is not limited to them, and other resins may be appropriately blended according to a physical property and the like required for the magnetic recording medium 10. The resin to be blended is not especially limited as long as this is generally used in an application type magnetic recording medium 10.

For example, there are polyvinyl chloride, polyvinyl acetate, vinyl chloride-vinyl acetate copolymer, vinyl chloride-vinylidene chloride copolymer, vinyl chloride-acrylonitrile copolymer, acrylic acid ester-acrylonitrile copolymer, acrylic acid ester-vinyl chloride-vinylidene chloride copolymer, vinyl chloride-acrylonitrile copolymer, acrylic acid ester-acrylonitrile copolymer, acrylic acid ester-vinylidene chloride copolymer, methacrylic acid ester-vinylidene chloride copolymer, methacrylic acid ester-vinyl chloride copolymer, methacrylic acid ester-ethylene copolymer, polyvinyl fluoride, vinylidene chloride-acrylonitrile copolymer, acrylonitrile-butadiene copolymer, polyamide resin, polyvinyl butyral, cellulose derivative (cellulose acetate butyrate, cellulose diacetate, cellulose triacetate, cellulose propionate, nitrocellulose), styrene-butadiene copolymer, polyester resin, amino resin, synthetic rubber and the like.

Furthermore, there are a phenol resin, an epoxy resin, a urea resin, a melamine resin, an alkyd resin, a silicone resin, a polyamine resin, a urea formaldehyde resin and the like as an example of a thermosetting resin or a reactive resin.

Furthermore, polar functional groups such as —SO$_3$M, —OSO$_3$M, —COOM, and P=O(OM)$_2$ may be introduced to each binder described above for the purpose of improving the dispersibility of the magnetic powder. Here, in the formulae, M is a hydrogen atom or an alkali metal such as lithium, potassium, and sodium.

Moreover, as the polar functional group, there are a side chain type having a terminal group of —NR1R2 and —NR1R2R3$^+$X$^-$, and a main chain type of >NR1R2$^+$X$^-$. Here, in the formulae, R1, R2 and R3 are a hydrogen atom or a hydrocarbon group, and X$^-$ is a halogen element ion such as fluorine, chlorine, bromine, and iodine, or an inorganic or organic ion. Furthermore, as the polar functional group, there may be —OH, —SH, —CN, an epoxy group and the like.

(Lubricant)

The lubricant preferably includes a compound represented by following general formula (1) and a compound represented by following general formula (2). Since the lubricant includes these compounds, the dynamic friction coefficient of the surface of the magnetic layer 13 may be especially reduced. Therefore, the traveling performance of the magnetic recording medium 10 may be further improved.

$$CH_3(CH_2)_n COOH \quad (1)$$

(where, in general formula (1), n is an integer selected from a range of 14 or larger and 22 or smaller.)

$$CH_3(CH_2)_p COO(CH_2)_q CH_3 \quad (2)$$

(where, in general formula (2), p is an integer selected from a range of 14 or larger and 22 or smaller, and q is an integer selected from a range of 2 or larger and 5 or smaller.)

(Additive)

The magnetic layer 13 may further include aluminum oxide ($\alpha$, $\beta$, or $\gamma$ alumina), chromium oxide, silicon oxide, diamond, garnet, emery, boron nitride, titanium carbide, silicon carbide, titanium carbide, titanium oxide (rutile type or anatase type titanium oxide) and the like as a nonmagnetic reinforcing particle.

(Underlayer)

The underlayer 12 is a nonmagnetic layer including nonmagnetic powder and a binder. The underlayer 12 may further include at least one additive of lubricant, a conductive particle, a curing agent, a rust inhibitor, or the like, as necessary.

The average thickness of the underlayer 12 is preferably 0.6 μm or larger and 2.0 μm or smaller, and more preferably 0.8 μm or larger and 1.4 μm or smaller. Note that the average thickness of the underlayer 12 may be obtained in a manner similar to that of the average thickness of the magnetic layer 13. However, magnification of the TEM image is appropriately adjusted according to the thickness of the underlayer 12.

The underlayer 12 preferably includes a large number of holes. Since the lubricant is stored in the large number of holes, it is possible to further suppress a decrease in supply amount of the lubricant between the surface of the magnetic layer 13 and the magnetic head even after the repeated recording or reproduction (that is, even after the magnetic head is brought into contact with the surface of the magnetic recording medium 10 and repeatedly travels). Therefore, the increase in dynamic friction coefficient may be further suppressed.

From a viewpoint of suppressing the decrease in dynamic friction coefficient after the repeated recording or reproduction, it is preferable that the hole of the underlayer 12 and the hole 13A of the magnetic layer 12 be connected. Here, a state in which the hole of the underlayer 12 and the hole 13A of the magnetic layer 12 are connected to each other includes a state in which some of the large number of holes of the underlayer 12 are connected to some of the large number of holes 13A of the magnetic layer 12.

From a viewpoint of improving the supply property of the lubricant to the surface of the magnetic layer 13, it is preferable that the large number of holes include those extending in the direction perpendicular to the surface of the magnetic layer 13. Furthermore, from a viewpoint of improving the supply property of the lubricant to the surface of the magnetic layer 13, it is preferable that the hole of the underlayer 12 extended in the direction perpendicular to the surface of the magnetic layer 13 is connected to the hole 13A of the magnetic layer 13 extended in the direction perpendicular to the surface of the magnetic layer 13.

(Nonmagnetic Powder)

The nonmagnetic powder includes, for example, at least any one of inorganic particle powder or organic particle powder. Furthermore, the nonmagnetic powder may include carbon powder such as carbon black. Note that one type of nonmagnetic powder may be used alone, or two or more types of nonmagnetic powders may be used in combination. The inorganic particle includes, for example, metal, metal oxide, metal carbonate, metal sulfate, metal nitride, metal carbide, metal sulfide and the like. A shape of the nonmagnetic powder may be, for example, various shapes such as a needle shape, a spherical shape, a cubic shape, a plate shape and the like, but is not limited thereto.

(Binder)

The binder is similar to that of the magnetic layer 13 described above.

(Back Layer)

The back layer 14 includes a binder and nonmagnetic powder. The back layer 14 may further include at least one type of additive of lubricant, a curing agent, an antistatic agent or the like, as necessary. The binder and the nonmagnetic powder are similar to those of the underlayer 12 described above.

An average particle size of the nonmagnetic powder is preferably 10 nm or larger and 150 nm or smaller, and more preferably 15 nm or larger and 110 nm or smaller. The average particle size of the nonmagnetic powder is obtained in a manner similar to that of the average particle size of the magnetic powder described above. The nonmagnetic powder may also include the nonmagnetic powder having two or more particle size distribution.

An upper limit value of an average thickness of the back layer 14 is preferably 0.6 μm or smaller. When the upper limit value of the average thickness of the back layer 14 is 0.6 μm or smaller, the thicknesses of the underlayer 12 and the base 11 may be kept thick even in a case where the average thickness of the magnetic recording medium 10 is 5.6 μm or smaller, so that traveling stability of the magnetic recording medium 10 in the recording/reproducing device may be maintained. A lower limit value of the average thickness of the back layer 14 is not especially limited; this is, for example, 0.2 μm or larger.

The average thickness of the back layer 14 is obtained as follows. First, the magnetic recording medium 10 having a width of ½ inch is prepared, and this cut into a length of 250 mm to fabricate a sample. Next, a thickness of the sample is measured in five or more positions using a laser holo gauge manufactured by Mitsutoyo as the measuring device, and simply averages (arithmetically averages) the measured values to calculate an average thickness $t_T$ [μm] of the magnetic recording medium 10. Note that the measurement positions are selected at random from the sample. Subsequently, the back layer 14 of the sample is removed with a solvent such as methyl ethyl ketone (MEK) or dilute hydrochloric acid.

Thereafter, the thickness of the sample is measured in five or more positions using the above-described laser holo gauge again, and simply averages (arithmetically averages) the measured values to calculate an average thickness $t_B$ [μm] of the magnetic recording medium 10 from which the back layer 14 is removed. Note that the measurement positions are selected at random from the sample. Thereafter, an average thickness $t_b$ [μm] of the back layer 14 is obtained by the following equation.

$$t_b[\mu m]=t_T[\mu m]-t_B[\mu m]$$

The back layer 14 includes a surface provided with a large number of projections 14A. The large number of projections 14A are to form a large number of holes 13A on the surface of the magnetic layer 13 in a state in which the magnetic recording medium 10 is rolled up. The large number of holes 13A include, for example, a large number of nonmagnetic particles projecting from the surface of the back layer 14.

(Average Thickness of Magnetic Recording Medium)

An upper limit value of the average thickness (average total thickness) of the magnetic recording medium 10 is preferably 5.6 μm or smaller, more preferably 5.0 μm or smaller, especially preferably 4.6 μm or smaller, and still more preferably 4.4 μm or smaller. When the average thickness of the magnetic recording medium 10 is 5.6 μm or smaller, the recording capacity which may be recorded in one data cartridge may be increased as compared with that of a general magnetic recording medium. A lower limit value of the average thickness of the magnetic recording medium 10 is not especially limited, but this is, for example, 3.5 μm or larger.

The average thickness of the magnetic recording medium 10 may be obtained by the procedure described in the method of obtaining the average thickness of the back layer 14 described above.

(Coercive Force Hc)

An upper limit value of the coercive force Hc in the longitudinal direction of the magnetic recording medium 10 is preferably 2000 Oe or smaller, more preferably 1900 Oe or smaller, and still more preferably 1800 Oe or smaller. When the coercivity force Hc2 in the longitudinal direction is 2000 Oe or smaller, the magnetization reacts with a high degree of sensitivity by a vertical magnetic field from the recording head, so that an excellent recording pattern may be formed.

A lower limit value of the coercive force Hc measured in the longitudinal direction of the magnetic recording medium 10 is preferably 1000 Oe or larger. When the lower limit value of the coercive force Hc in the longitudinal direction is 1000 Oe or larger, it is possible to suppress demagnetization due to a leakage flux from the recording head.

The above-described coercive force Hc is obtained as follows. First, the measurement sample is cut out from the elongated magnetic recording medium 10, and an M-H loop of a whole of the measurement sample is measured in the longitudinal direction of the measurement sample (traveling direction of the magnetic recording medium 10) using a vibrating sample magnetometer (VSM). Next, a coating film (underlayer 12, magnetic layer 13, back layer 14 or the like) is wiped with acetone, ethanol, or the like, only the base 11 is left as a sample for background correction, and the M-H loop of the base 11 is measured in the longitudinal direction of the base 11 (traveling direction of the magnetic recording medium 10) by using the VSM. Thereafter, the M-H loop of the base 11 is subtracted from the M-H loop of the entire measurement sample to obtain an M-H loop after the background correction. The coercive force Hc is obtained from the obtained M-H loop. Note that it is assumed that every measurement of the M-H loop described above is performed at 25 degrees C. Furthermore, it is assumed that "demagnetizing field correction" when measuring the M-H loop in the longitudinal direction of the magnetic recording medium 10 is not performed.

(Square Ratio)

A square ratio S1 in the vertical direction (thickness direction) of the magnetic recording medium 10 is 65% or larger, preferably 70% or larger, more preferably 75% or larger, still more preferably 80% or larger, and especially preferably 85% or larger. When the square ratio S1 is 65% or larger, the vertical orientation of the magnetic powder is sufficiently high, so that a more excellent SNR may be obtained.

The square ratio S1 is obtained as follows. First, the measurement sample is cut out from the elongated magnetic recording medium 10, and the M-H loop of the entire measurement sample corresponding to the vertical direction (thickness direction) of the magnetic recording medium 10 is measured using the VSM. Next, the coating film (underlayer 12, magnetic layer 13, back layer 14 or the like) is wiped with acetone, ethanol, or the like, only the base 11 is left as the sample for the background correction, and the M-H loop of the base 11 corresponding to the vertical direction of the base 11 (vertical direction of the magnetic recording medium 10) is measured by using the VSM. Thereafter, the M-H loop of the base 11 is subtracted from the M-H loop of the entire measurement sample to obtain an M-H loop after the background correction. A square ratio S1(%) is calculated by substituting saturation magnetization Ms (emu) and residual magnetization Mr (emu) of the obtained M-H loop into the following equation. Note that it is assumed that every measurement of the M-H loop described above is performed at 25 degrees C. Furthermore, it is assumed that "demagnetizing field correction" when measuring the M-H loop in the vertical direction of the magnetic recording medium 10 is not performed.

$$\text{square ratio } S1(\%)=(Mr/Ms)\times 100$$

A square ratio S2 in the longitudinal direction (traveling direction) of the magnetic recording medium 10 is preferably 35% or smaller, more preferably 30% or smaller, still more preferably 25% or smaller, especially preferably 20% or smaller, and most preferably 15% or smaller. When the square ratio S2 is 35% or smaller, the vertical orientation of the magnetic powder is sufficiently high, so that a more excellent SNR may be obtained.

The square ratio S2 is obtained in a manner similar to that of the square ratio S1 except that the M-H loop is measured in the longitudinal direction (traveling direction) of the magnetic recording medium 10 and the base 11.

(SFD)

Figure 4:
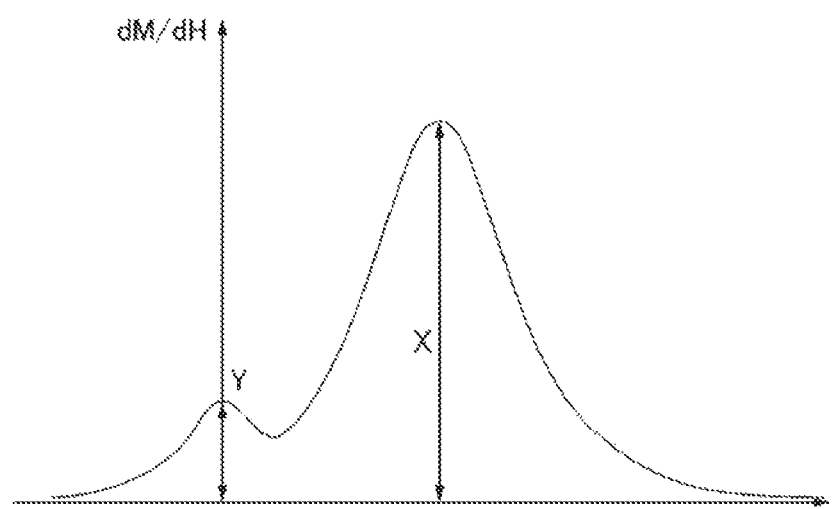
FIG. 4 is a graph illustrating an example of an SFD curve.

In a switching field distribution (SFD) curve of the magnetic recording medium 10, a peak ratio X/Y between a main peak height X and a height Y of a subpeak near a magnetic field zero is preferably 3.0 or larger, more preferably 5.0 or larger, still more preferably 7.0 or larger, especially preferably 10.0 or larger, and most preferably 20.0 or larger (refer to FIG. 4). When the peak ratio X/Y is 3.0 or larger, it is possible to suppress a large amount of low coercive force components unique to ε-iron oxide (for example, soft magnetic particle, superparamagnetic particle and the like) in addition to the ε-iron oxide particle contributing to actual recording from being included in the magnetic powder. Therefore, it is possible to suppress deterioration in magnetization signal recorded in the adjacent track by the leakage magnetic field from the recording head, so that it is possible to obtain more excellent SNR. An upper limit value of the peak ratio X/Y is not especially limited, but is, for example, 100 or smaller.

The above-described peak ratio X/Y is obtained as follows. First, an M-H loop after background correction is obtained in a manner similar to the method of measuring the square ratio S1 described above. Next, the SFD curve is calculated from the obtained M-H loop. To calculate the SFD curve, a program attached to a measuring machine may be used, or other programs may be used. Assume that an absolute value of a point at which the calculated SFD curve crosses the Y axis (dM/dH) is "Y", a height of the main peak found in the vicinity of the coercive force Hc in the M-H loop is "X", the peak ratio X/Y is calculated. Note that it is assumed that the measurement of the M-H loop is performed at 25 degree C. as in the case with the measurement method of the coercive force Hc described above. Furthermore, "demagnetizing field correction" when measuring the M-H loop in the thickness direction (vertical direction) of the magnetic recording medium 10 is not performed.

(Activation Volume $V_{act}$)

An activation volume $V_{act}$ is preferably 8000 nm$^3$ or smaller, more preferably 6000 nm$^3$ or smaller, still more preferably 5000 nm$^3$ or smaller, especially preferably 4000 nm$^3$ or smaller, and most preferably 3000 nm$^3$ or smaller. When the activation volume $V_{act}$ is 8000 nm$^3$ or smaller, a dispersion state of the magnetic powder becomes excellent, so that a bit inversion region may be made steep, and it is possible to suppress the deterioration in magnetic signal recorded in the adjacent track by the leakage magnetic field from the recording head. Therefore, there is a possibility that more excellent SNR cannot be obtained.

The above-described activation volume $V_{act}$ is obtained by following equation derived by Street and Woolley.

$$V_{act}(\text{nm}^3) = k_B \times T \times X_{irr} / (\mu_0 \times Ms \times S)$$

(where $k_B$: Boltzmann's constant (1.38×10$^{-23}$ J/K), T: temperature (K), $X_{irr}$: irreversible magnetic susceptibility, $\mu_0$: vacuum magnetic permeability, S: magnetic viscosity coefficient, and Ms: saturation magnetization (emu/cm$^3$))

The irreversible magnetic susceptibility $X_{irr}$, the saturation magnetization Ms, and the magnetic viscosity coefficient S to be substituted in the above formula are obtained as follows by using VSM. Note that a measurement direction by the VSM is assumed to be the thickness direction (vertical direction) of the magnetic recording medium 10. Furthermore, the measurement by the VSM is performed on the measurement sample cut out from the elongated magnetic recording medium 10 at 25 degrees C. Furthermore, "demagnetizing field correction" when measuring the M-H loop in the thickness direction (vertical direction) of the magnetic recording medium 10 is not performed.

(Irreversible Magnetic Susceptibility $X_{irr}$)

The irreversible magnetic susceptibility $X_{irr}$ is defined as an inclination in the vicinity of a residual coercive force Hr in an inclination of a residual magnetization curve (DCD curve). First, a magnetic field of −1193 kA/m (15 kOe) is applied to a whole of the magnetic recording medium 10, and the magnetic field is returned to zero to obtain a residual magnetization state. Thereafter, a magnetic field of about 15.9 kA/m (200 Oe) is applied in the opposite direction to return to zero again, and a residual magnetization amount is measured. Thereafter, similarly, measurement to apply a magnetic field larger than the above-described applied magnetic field by 15.9 kA/m to return to zero is repeatedly performed, the residual magnetization amount is plotted to the applied magnetic field, and the DCD curve is measured. From the obtained DCD curve, a point at which the magnetization amount is zero is made the residual coercive force Hr, the DCD curve is further differentiated, and the inclination of the DCD curve at each magnetic field is obtained. In the inclination of this DCD curve, the inclination in the vicinity of the residual coercive force Hr is $X_{irr}$.

(Saturation Magnetization Ms)

First, an M-H loop after background correction is obtained in a manner similar to the method of measuring the square ratio S1 described above. Next, Ms (emu/cm$^3$) is calculated from a value of saturation magnetization Ms (emu) of the obtained M-H loop and the volume (cm$^3$) of the magnetic layer 13 in the measurement sample. Note that the volume of the magnetic layer 13 is obtained by multiplying the area of the measurement sample by the average thickness of the magnetic layer 13. The method of calculating the average thickness of the magnetic layer 13 required for calculating the volume of the magnetic layer 13 is as described above.

(Magnetic Viscosity Coefficient S)

First, a magnetic field of −1193 kA/m (15 kOe) is applied to a whole of the magnetic recording medium 10 (measurement sample), and the magnetic field is returned to zero to obtain the residual magnetization state. Thereafter, a magnetic field equivalent to the value of the residual coercive force Hr obtained from the DCD curve is applied in the opposite direction. The magnetization amount is continuously measured at regular time intervals for 1000 seconds in a state in which the magnetic field is applied. A magnetic viscosity coefficient S is calculated by checking a relationship between time t and the magnetization amount M(t) against the following formula obtained in this manner.

$$M(t) = M0 + S \times \ln(t)$$

(where M(t): magnetization amount at time t, M0: initial magnetization amount, S: magnetic viscosity coefficient, and ln(t): natural logarithm of time)

(Dynamic Friction Coefficient)

A friction coefficient ratio ($\mu_B/\mu_A$) when a dynamic friction coefficient $\mu_A$ between the surface of the magnetic layer 13 and the magnetic head when tension applied to the magnetic recording medium 10 is 1.2 N and the dynamic friction coefficient $\mu_B$ between the surface of the magnetic layer 13 and the magnetic head when the tension applied to the magnetic recording medium 10 is 0.4 N is preferably 1.0 or larger and 2.1 or smaller, and more preferably 1.0 or larger and 2.0 or smaller. When the friction coefficient ratio ($\mu_B/\mu_A$) is 1.0 or larger and 2.1 or smaller, a change in dynamic friction coefficient due to tension fluctuation during travel may be reduced, so that the travel of the magnetic recording medium 10 may be stabilized.

In a case where a dynamic friction coefficient between the surface of the magnetic layer 13 and the magnetic head when the tension applied to the magnetic recording medium 10 is 0.6 N is $\mu_C$, a friction coefficient ratio ($\mu_C(1000)/\mu_C(5)$) between a dynamic friction coefficient $\mu_C(5)$ in fifth travel and a dynamic friction coefficient $\mu_C(1000)$ in 1000th travel is preferably 1.0 or larger and 2.0 or smaller, and more preferably 1.0 or larger and 1.5 or smaller. When the friction coefficient ratio ($\mu_C(1000)/\mu_C(5)$) is 1.0 or larger and 2.0 or smaller, a change in dynamic friction coefficient due to multiple travels may be reduced, so that the travel of the magnetic recording medium 10 may be stabilized. Here, the magnetic head of a drive corresponding to the magnetic recording medium 10 is used.

[2 Method of Manufacturing Magnetic Recording Medium]

Next, a method of manufacturing the magnetic recording medium 10 having the above-described configuration is described. First, the nonmagnetic powder, the binder, the lubricant and the like are kneaded and dispersed in the solvent to prepare an underlayer forming paint. Next, the magnetic powder, the binder, the lubricant and the like are kneaded and dispersed in the solvent to prepare a magnetic layer forming paint. Next, the binder, the nonmagnetic powder and the like are kneaded and dispersed in the solvent to prepare a back layer forming paint. For preparation of the magnetic layer forming pint, the underlayer forming paint, and the back layer forming paint, for example, the following solvent, dispersing device, and kneading device may be used.

Examples of the solvent used for the above-described paint preparation include, for example, ketone solvents such as acetone, methyl ethyl ketone, methyl isobutyl ketone, and cyclohexanone, alcohol solvents such as methanol, ethanol, and propanol, ester solvents such as methyl acetate, ethyl acetate, butyl acetate, propyl acetate, ethyl lactate, and ethylene glycol acetate, ether solvents such as diethylene glycol dimethyl ether, 2-ethoxyethanol, tetrahydrofuran, and dioxane, aromatic hydrocarbon solvents such as benzene, toluene, and xylene, halogenated hydrocarbon solvents such as methylene chloride, ethylene chloride, carbon tetrachloride, chloroform, and chlorobenzene. They may be used alone, or they may be mixed appropriately.

As the kneading device used for the above-described paint preparation, for example, kneading devices such as a continuous two-axis kneader, a continuous two-axis kneader capable of diluting in multiple stages, a kneader, a pressure kneader, and a roll kneader may be used, but this is not especially limited to such devices. Furthermore, as the dispersing device used for the above-described paint preparation, for example, dispersing devices such as a roll mill, a ball mill, a horizontal sand mill, a vertical sand mill, a spike mill, a pin mill, a tower mill, a pearl mill (for example, "DCP mill" manufactured by Eirich Co., Ltd. and the like), a homogenizer, and an acoustic wave dispersing device may be used, but it is not especially limited to these devices.

Next, the underlayer forming paint is applied to one main surface of the base 11 and dried to form the underlayer 12. Subsequently, the magnetic layer forming paint is applied onto the underlayer 12 and dried to form the magnetic layer 13 on the underlayer 12. Note that, at the time of drying, it is preferable to perform magnetic field orientation of the magnetic powder in the thickness direction of the base 11 by, for example, a solenoid coil. Furthermore, at the time of drying, it is also possible to perform the magnetic field orientation of the magnetic powder in the thickness direction of the base 11 after the magnetic field orientation in the traveling direction (longitudinal direction) of the base 11 by, for example, the solenoid coil. By performing such magnetic field orientation treatment, a degree of vertical orientation (that is, the square ratio S1) of the magnetic powder may be improved. After the magnetic layer 13 is formed, the back layer forming paint is applied to the other main surface of the base 11 and dried to form the back layer 14. With this arrangement, the magnetic recording medium 10 is obtained.

The square ratios S1 and S2 are, for example, set to desired values by adjusting strength of the magnetic field applied to the coating of the magnetic layer forming paint, concentration of a solid content in the magnetic layer forming paint, and a drying condition of the coating of the magnetic layer forming paint (drying temperature and drying time). The strength of the magnetic field applied to the coating is preferably twice and larger and three times or smaller of the coercive force of the magnetic powder. In order to further increase the square ratio S1 (that is, to further decrease the square ratio S2), it is preferable to improve the dispersion state of the magnetic powder in the magnetic layer forming paint. Furthermore, in order to further increase the square ratio S1, it is also effective to magnetize the magnetic powder at a stage before the magnetic layer forming paint enters an orienting device for performing the magnetic field orientation of the magnetic powder. Note that, the methods of adjusting the square ratios S1 and S2 may be used alone, or two or more methods may be used in combination.

Thereafter, the obtained magnetic recording medium 10 is subjected to calender treatment to smooth the surface of the magnetic layer 13. Next, the magnetic recording medium 10 subjected to the calender treatment is wound into a roll, and the magnetic recording medium 10 is subjected to heat treatment in this state to transfer a large number of projections 14A on the surface of the back layer 14 to the surface of the magnetic layer 13. With this arrangement, a large number of holes 13A are formed on the surface of the magnetic layer 13.

The temperature of the heat treatment is preferably 55 degrees C. or higher and 75 degrees C. or lower. Excellent transferability may be obtained when the temperature of the heat treatment is 55 degree C. or higher. On the other hand, when the temperature of the heat treatment is 75 degrees C. or higher, the pore amount becomes too large, and there is a possibility that the lubricant on the surface of the magnetic layer 13 becomes excessive. Here, the temperature of the heat treatment is temperature of an atmosphere which holds the magnetic recording medium 10.

Heat treatment time is preferably 15 hours or longer and 40 hours or shorter. When the heat treatment time is 15 hours or longer, the excellent transferability may be obtained. On the other hand, when the heat treatment time is 40 hours or shorter, a decrease in productivity may be suppressed.

Finally, the magnetic recording medium 10 is cut into a predetermined width (for example, ½ inch width). Thus, a target magnetic recording medium 10 may be obtained.

[3 Configuration of Recording/Reproducing Device]

Figure 5:
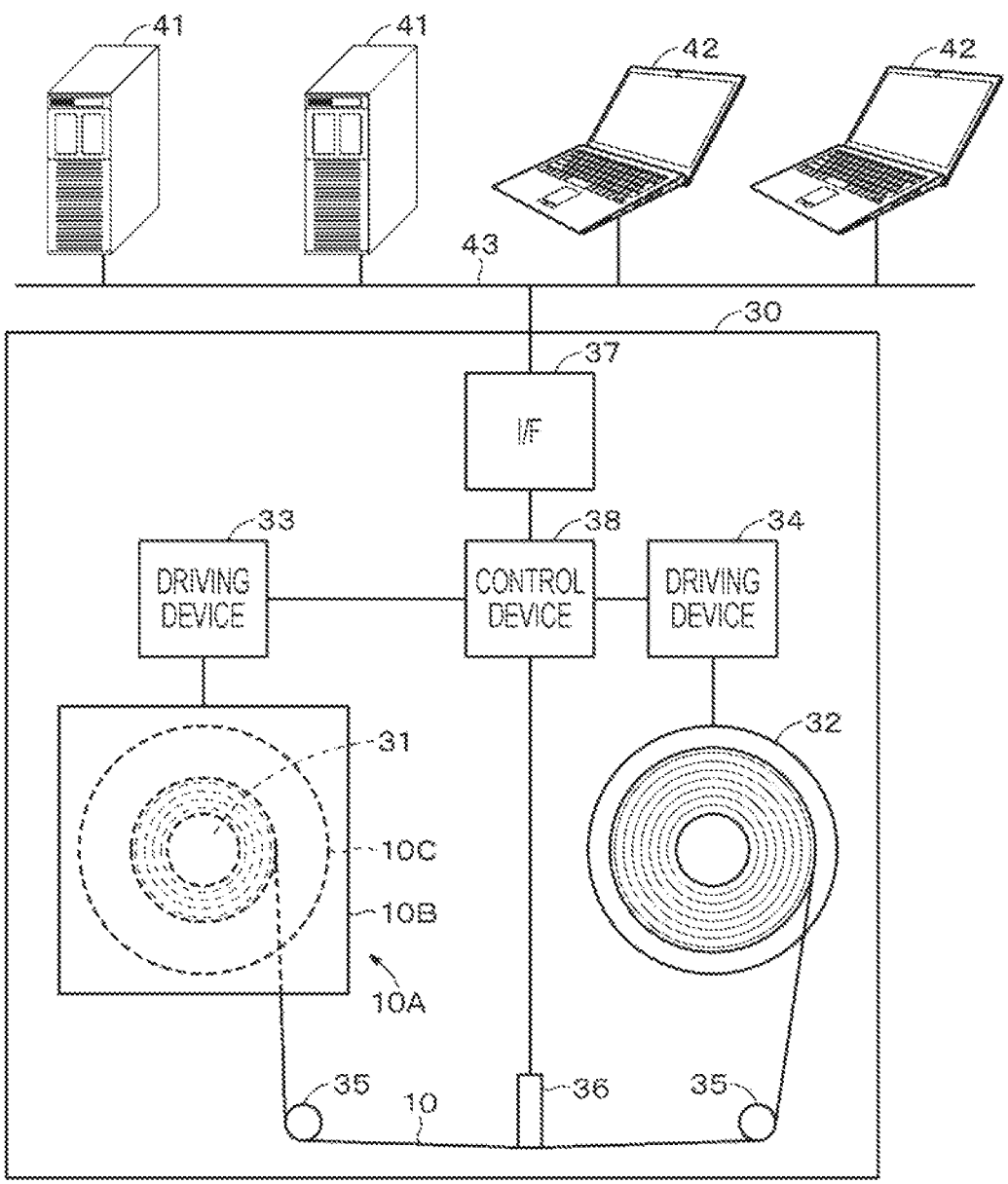
FIG. 5 is a schematic diagram of a recording/reproducing device.

Next, with reference to FIG. 5, a configuration of the recording/reproducing device 30 which performs recording and reproduction of the magnetic recording medium 10 having the above-described configuration is described.

The recording/reproducing device 30 has a configuration on which the magnetic recording medium cartridge 10A may be loaded. Here, in order to make the description easy, a case where the recording/reproducing device 30 has a configuration on which one magnetic recording medium cartridge 10A may be loaded is described, but it is also possible that the recording/reproducing device 30 has a configuration on which a plurality of magnetic recording medium cartridges 10A may be loaded.

The recording/reproducing device 30 is connected to an information processing device such as a server 41 and a personal computer (hereinafter referred to as "PC") 42 via a network 43, and is configured to be able to record data supplied from the information processing devices in the magnetic recording medium cartridge 10A.

As illustrated in FIG. 5, the recording/reproducing device 30 is provided with a spindle 31, a reel 32 on the recording/reproducing device 30 side, a spindle driving device 33, a reel driving device 34, a plurality of guide rollers 35, a head unit 36, a communication interface (hereinafter, I/F) 37, and a control device 38.

The spindle 31 is configured such that a magnetic recording medium cartridge 10A may be loaded thereon. The magnetic recording medium cartridge 10A conforming to linear tape open (LTO) standards accommodates a single reel 10C obtained by winding the magnetic recording medium 10 in a cartridge case 10B so as to be rotatable. In the magnetic recording medium 10, a servo pattern in an inverted V-shape is recorded in advance as a servo signal. The reel 32 is configured to be able to fix a leading end of the magnetic recording medium 10 drawn out from the magnetic recording medium cartridge 10A.

The spindle driving device 33 is a device which rotationally drives the spindle 31. The reel driving device 34 is a device which rotationally drives the reel 32. When the data is recorded in or reproduced from the magnetic recording medium 10, the spindle driving device 33 and the reel driving device 34 rotate the spindle 31 and the reel 32, respectively, to allow the magnetic recording medium 10 to travel. The guide roller 35 is a roller for guiding the travel of the magnetic recording medium 10.

The head unit 36 is provided with a plurality of recording heads for recording data signals in the magnetic recording medium 10, a plurality of reproducing heads for reproducing the data signals recorded in the magnetic recording medium 10, and a plurality of servo heads for reproducing the servo signals recorded in the magnetic recording medium 10. As the recording head, for example, a ring head may be used, but the type of the recording head is not limited thereto.

The communication I/F 37 is for communicating with the information processing device such as the server 41 and the PC 42, and is connected to the network 43.

The control device 38 controls a whole of the recording/reproducing device 30. For example, in response to a request from the information processing device such as the server 41 and the PC 42, the control device 38 records the data signal supplied from the information processing device in the magnetic recording medium 10 by the head unit 36. Furthermore, in response to a request from the information processing device such as the server 41 and the PC 42, the control device 38 reproduces the data signal recorded in the magnetic recording medium 10 by the head unit 36 and supplies the data signal to the information processing device.

[4 Effect]

The magnetic recording medium 10 according to one embodiment is provided with the base 11, the underlayer 12 provided on the base 11, and the magnetic layer 13 provided on the underlayer 12 including the lubricant. The magnetic layer 13 has the surface provided with a large number of holes 13A. Arithmetic average roughness Ra of the surface of the magnetic layer 13 is 2.5 nm or smaller, and the BET specific surface area of the whole of the magnetic recording medium 10 in a state in which the lubricant is removed is 4 m$^2$/mg or larger. With this arrangement, in the magnetic recording medium 10 in which the arithmetic average roughness Ra of the surface of the magnetic layer 13 is 2.5 nm or smaller, a decrease in the supply of the lubricant to the space between the surface of the magnetic layer 13 and the magnetic head may be suppressed even after repeated recording or reproduction is performed. Therefore, the excellent electromagnetic conversion characteristic may be obtained and an increase in dynamic friction coefficient may be suppressed. Furthermore, since exhaustion of the lubricant may be suppressed, it is also possible to suppress difficulty in recording and reproduction due to head locking.

[5 Variation]

Figure 6:
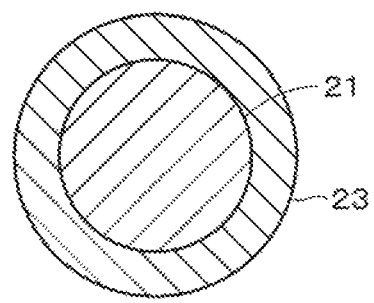
FIG. 6 is a cross-sectional view of a magnetic particle in a variation.

(Variation 1) In one embodiment described above, a case where the ε-iron oxide particle has the shell 22 having the two-layer structure is described; but as illustrated in FIG. 6, the ε-iron oxide particle may also have a shell 23 having a single-layer structure. In this case, the shell 23 has the configuration similar to that of the first shell 22a. However, from a viewpoint of suppressing deterioration in characteristic of the ε-iron oxide particle, it is preferable that the ε-iron oxide particle has the shell 22 having the two-layer structure as in one embodiment described above.

(Variation 2)

Although a case where the ε-iron oxide particle has a core-shell structure is described in one embodiment described above, the ε-iron oxide particle may include an additive in place of the core-shell structure, and include the additive together with the core-shell structure. In this case, a part of Fe of the ε-iron oxide particle is substituted with the additive. The coercive force Hc of all the ε-iron oxide particles may be adjusted to the coercive force Hc suitable for recording also when the ε-iron oxide particle includes the additive, so that recordability may be improved. The additive is a metal element other than iron, preferably a trivalent metal element, more preferably at least one of Al, Ga, or In, and still more preferably at least one of Al or Ga.

Specifically, ε-iron oxide including the additive is an ε-Fe$_{2-x}$M$_x$O$_3$ crystal (where M is a metal element other than iron, preferably a trivalent metal element, more preferably at least one of Al, Ga, or In, and still more preferably at least one of Al or Ga; x satisfies, for example, $0<x<1$).

(Variation 3)

The magnetic powder may also include powder of nanoparticles containing hexagonal ferrite (hereinafter referred to as "hexagonal ferrite particles") in place of the powder of the ε-iron oxide particles. The hexagonal ferrite particle has, for example, a hexagonal plate shape or a substantially hexagonal plate shape. The hexagonal ferrite preferably includes at least one of Ba, Sr, Pb, or Ca, and more preferably at least one of Ba or Sr. Specifically, the hexagonal ferrite may be, for example, barium ferrite or strontium ferrite. Barium ferrite may further include at least one of Sr, Pb, or Ca in addition to Ba. In addition to Sr, strontium ferrite may further include at least one of Ba, Pb, or Ca.

More specifically, hexagonal ferrite has an average composition represented by general formula MFe$_{12}$)$_{19}$. M is at least one metal of Ba, Sr, Pb, or Ca, preferably at least one metal of Ba or Sr, for example. M may be a combination of Ba and one or more metals selected from a group of Sr, Pb, and Ca. Furthermore, M may be a combination of Sr and one or more metals selected from a group of Ba, Pb, and Ca. A part of Fe in the above-described general expression may be substituted with another metal element.

In a case where the magnetic powder includes powder of the hexagonal ferrite particle, the average particle size of the magnetic powder is preferably 30 nm or smaller, more preferably 12 nm or larger and 25 nm or smaller, and still more preferably 15 nm or larger and 22 nm or smaller. When the average particle size of the magnetic powder is 30 nm or smaller, an excellent electromagnetic conversion characteristic (for example, C/N) may be obtained in the magnetic recording medium 10 of high recording density. On the other hand, when the average particle size of the magnetic powder is 12 nm or larger, the dispersibility of the magnetic powder is further improved, and more excellent electromagnetic conversion characteristic (for example, C/N) may be obtained. In a case where the magnetic powder includes the powder of the hexagonal ferrite particle, the average aspect ratio of the magnetic powder is similar to that of one embodiment described above.

Note that the average particle size and the average aspect ratio of the magnetic powder are obtained as follows. First, the magnetic recording medium 10 to be measured is processed by the FIB method or the like to prepare a laminate, and a cross-section of the laminate is observed by TEM. Next, 50 magnetic powders oriented at an angle of 75 degrees or larger with respect to a horizontal direction are randomly selected from the taken TEM photograph, and a maximum plate thickness DA of each magnetic powder is measured. Subsequently, a maximum plate thicknesses DA of the measured 50 magnetic powders are simply averaged (arithmetically averaged) to obtain an average maximum plate thickness DAave.

Next, the surface of the magnetic layer 13 of the magnetic recording medium 10 is observed by the TEM. Next, 50 magnetic powders are randomly selected from the taken TEM photograph, and a maximum plate diameter DB of each magnetic powder is measured. Here, the maximum plate diameter DB means the largest one of distances between two parallel lines drawn from all angles so as to be in contact with a contour of the magnetic powder (so-called maximum Feret's diameter). Subsequently, the maximum plate diameters DB of the measured 50 magnetic powders are simply averaged (arithmetically averaged) to obtain an average maximum plate diameter DBave. An average long axis length DBave obtained in this manner is made the average particle size of the magnetic powder. Next, an average aspect ratio (DBave/DAave) of the magnetic powder is obtained from the average maximum plate thickness DAave and the average maximum plate diameter DBave.

In a case where the magnetic powder includes the powder of the hexagonal ferrite particles, the average particle volume of the magnetic powder is preferably 5900 nm³ or smaller, more preferably 500 nm³ or larger and 3400 nm³ or smaller, and still more preferably 1000 nm³ or larger and 2500 nm³ or smaller. When the average particle volume of the magnetic powder is 5900 nm³ or smaller, an effect similar to that in a case where the average particle size of the magnetic powder is 30 nm or smaller may be obtained. On the other hand, when the average particle volume of the magnetic powder is 500 nm³ or larger, an effect similar to that in a case where the average particle size of the magnetic powder is 12 nm larger smaller may be obtained.

Note that the average particle volume of the magnetic powder is obtained as follows. First, the average long axis length DAave and the average maximum plate diameter DBave are obtained by the above-described method of calculating the average particle size of the magnetic powder. Next, the average volume V of the ε-iron oxide particle is obtained by the following expression.

$$V = 3\sqrt{3}/8 \times DAave \times DBave \times DBave^2$$

(Variation 4)

The magnetic powder may also include powder of nanoparticles containing Co-containing spinel ferrite (hereinafter referred to as "cobalt ferrite particles") in place of the powder of the ε-iron oxide particles. The cobalt ferrite particle preferably has uniaxial anisotropy. The cobalt ferrite particle has, for example, a cubic shape or a substantially cubic shape. Co-containing spinel ferrite may further include at least one of Ni, Mn, Al, Cu, or Zn in addition to Co.

Co-containing spinel ferrite has, for example, an average composition represented by following formula (1).

$$Co_xM_yFeO_z \quad (1)$$

(where, in formula (1), M is, for example, at least one metal of Ni, Mn, Al, Cu, or Zn, x is a value within a range of $0.4 \le x \le 1.0$, y is a value within a range of $0 \le y \le 0.3$, x and y satisfying a relationship of $(x+y) \le 1.0$, and z is a value within a range of $3 \le z \le 4$. A part of Fe may be substituted with another metal element.)

In a case where the magnetic powder includes powder of the cobalt ferrite particles, the average particle size of the magnetic powder is preferably 25 nm or smaller, and more preferably 10 nm or larger and 23 nm or smaller. When the average particle size of the magnetic powder is 25 nm or smaller, the excellent electromagnetic conversion characteristic (for example, SNR) may be obtained in the magnetic recording medium 10 of high recording density. On the other hand, when the average particle size of the magnetic powder is 10 nm or larger, the dispersibility of the magnetic powder is further improved, and more excellent electromagnetic conversion characteristic (for example, SNR) may be obtained. In a case where the magnetic powder includes the powder of the cobalt ferrite particles, the average aspect ratio of the magnetic powder is similar to that of one embodiment described above. Furthermore, the average particle size and the average aspect ratio of the magnetic powder may also be obtained in a manner similar to that of the calculation method of one embodiment described above.

The average particle volume of the magnetic powder is preferably 15000 nm³ or smaller, and more preferably 1000 nm³ or larger and 12000 nm³ or smaller. When the average particle volume of the magnetic powder is 15000 nm³ or smaller, an effect similar to that in a case where the average particle size of the magnetic powder is made 25 nm or smaller may be obtained. On the other hand, when the average particle volume of the magnetic powder is 1000 nm³ or larger, the effect similar to that in a case where the average particle size of the magnetic powder is 10 nm or larger may be obtained. Note that, the average particle volume of the magnetic powder is similar to the method of calculating the average particle volume of the magnetic powder in one embodiment described above (method of calculating the average particle volume in a case where ε-iron oxide particle has a cubic shape or a substantially cubic shape).

(Variation 5)

Figure 7:
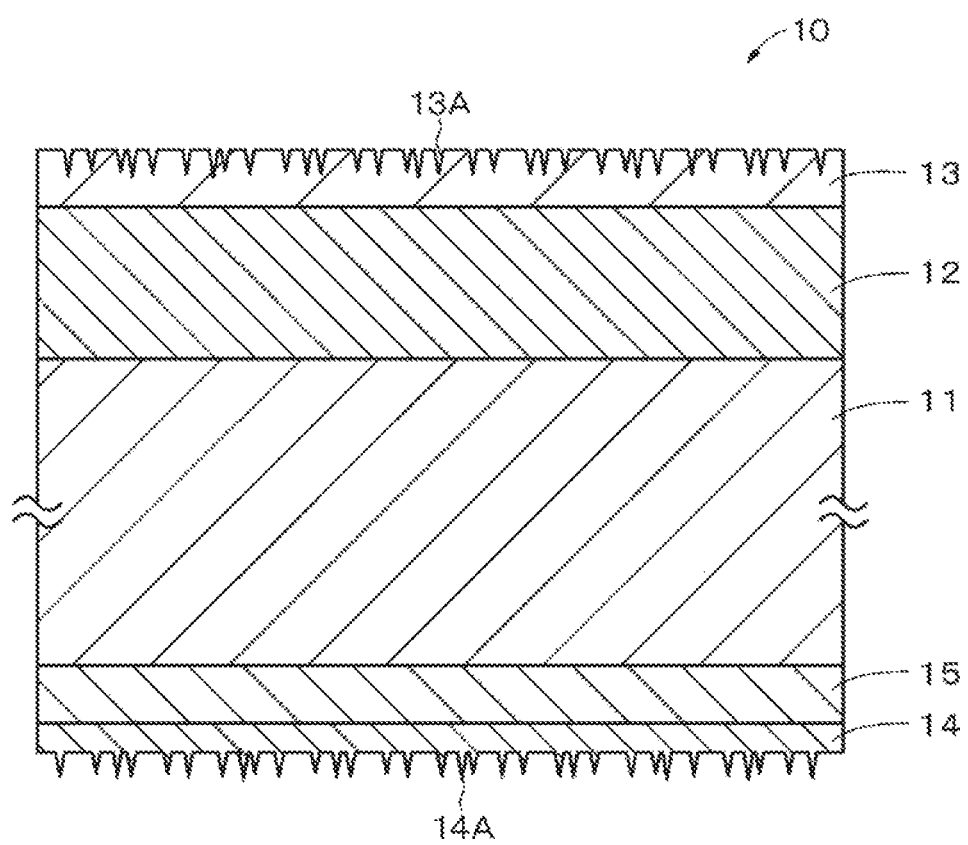
FIG. 7 is a cross-sectional view of a magnetic recording medium in a variation.

The magnetic recording medium 10 may further be provided with a barrier layer 15 provided on at least one surface of the base 11 as illustrated in FIG. 7. The barrier layer 15 is a layer for suppressing a dimensional change according to an environment of the base 11. For example, although there is hygroscopicity of the base 11 as an example of a cause of the dimensional change, a penetrating speed of water to the base 11 may be reduced by providing the barrier layer 15. The barrier layer 15 includes, for example, metal or a metal oxide. As the metal, for example, at least one of Al, Cu, Co, Mg, Si, Ti, V, Cr, Mn, Fe, Ni, Zn, Ga, Ge, Y, Zr, Mo, Ru, Pd, Ag, Ba, Pt, Au, or Ta may be used. As the metal oxide, for example, a metal oxide including one or two or more of the above metals may be used. More specifically, for example, at least one of $Al_2O_3$, CuO, CoO, $SiO_2$, $Cr_2O_3$, $TiO_2$, $Ta_2O_5$, or $ZrO_2$ may be used. Furthermore, the barrier layer 15 may include diamond-like carbon (DLC), diamond or the like.

An average thickness of the barrier layer 15 is preferably 20 nm or larger and 1000 nm or smaller, and more preferably 50 nm or larger and 1000 nm or smaller. The average thickness of the barrier layer 15 is obtained in a manner similar to that of the average thickness of the magnetic layer 13. However, magnification of the TEM image is appropriately adjusted according to the thickness of the barrier layer 15.

(Variation 6)

In one embodiment described above, a case where a large number of holes 13A are formed on the surface of the magnetic layer 13 by transferring a large number of projections 14A provided on the surface of the back layer 14 to the surface of the magnetic layer 13 is described; however, a method of forming the large number of holes 13A is not limited to this. For example, the large number of holes 13A may be formed on the surface of the magnetic layer 13 by adjusting a type of solvent included in the magnetic layer forming paint, a drying condition of the magnetic layer forming paint and the like.

(Variation 7)

The magnetic recording medium 10 according to one embodiment described above may be used in a library device. In this case, the library device may be provided with a plurality of recording/reproducing devices 30 in one embodiment described above.

Example

Hereinafter, the present disclosure is specifically described with reference to examples, but the present disclosure is not limited only to these examples.

In the following examples and comparative examples, a square ratio S1 in a vertical direction, a square ratio S2 in a longitudinal direction, a BET specific surface area, a pore distribution (pore volume, pore diameter of maximum pore volume at desorption), an average aspect ratio, an average particle volume of magnetic powder, an average particle size of the magnetic powder, an average thickness of a magnetic layer, an average thickness of an underlayer, an average thickness of a back layer, and arithmetic average roughness of a surface of the magnetic layer are values obtained by the measuring method described in one embodiment described above.

Examples 1 to 4, 14, and 15

(Preparing Step of Magnetic Layer Forming Paint)

A magnetic layer forming paint was prepared as follows. First, a first composition having the following formulation was kneaded with an extruder. Next, the kneaded first composition and a second composition of the following formulation were added to a stirring tank equipped with a disper and premixing was carried out. Subsequently, sand mill mixing was further carried out and filter treatment was carried out to prepare the magnetic layer forming paint.

(First Composition)

powder of barium ferrite ($BaFe_{12}O_{19}$) particles (hexagonal plate shape, average aspect ratio 2.8, average particle volume 1950 $nm^3$): 100 parts by mass vinyl chloride resin (cyclohexanone solution 30 mass %): 10 parts by mass (degree of polymerization 300, Mn=10000, containing $OSO_3K$=0.07 mmol/g, and secondary OH=0.3 mmol/g as a polar group).

aluminum oxide powder: 5 parts by mass ($\alpha$-$Al_2O_3$, average particle diameter 0.2 μm)

carbon black: 2 parts by mass (manufactured by Tokai Carbon Co., Ltd., trade name: SEAST TA)

(Second Composition)

vinyl chloride resin: 1.1 parts by mass (resin solution: resin content 30 mass %, cyclohexanone 70 mass %)

n-butyl stearate: 2 parts by mass methyl ethyl ketone: 121.3 parts by mass toluene: 121.3 parts by mass cyclohexanone: 60.7 parts by mass Finally, 4 parts by mass of polyisocyanate (trade name: Coronate L, manufactured by Nippon Polyurethane Industry Co., Ltd.) as a curing agent and 2 parts by mass of stearic acid as lubricant were added to the magnetic layer forming paint prepared as described above.

(Step of Preparing Underlayer Forming Paint)

An underlayer forming paint was prepared as follows. First, a third composition having the following formulation was kneaded with an extruder. Next, the kneaded third composition and a fourth composition of the following formulation were added to a stirring tank equipped with a disper and premixing was carried out. Subsequently, sand mill mixing was further carried out and filter treatment was carried out to prepare the underlayer forming paint.

(Third Composition)

acicular iron oxide powder: 100 parts by mass ($\alpha$-$Fe_2O_3$, average long axis length 0.15 μm)

vinyl chloride resin: 55.6 parts by mass (resin solution: resin content 30 mass %, cyclohexanone 70 mass %)

carbon black: 10 parts by mass (average particle diameter 20 nm)

(Fourth Composition)

polyurethane resin UR 8200 (manufactured by TOYOBO CO., LTD.): 18.5 parts by mass n-butyl stearate: 2 parts by mass methyl ethyl ketone: 108.2 parts by mass toluene: 108.2 parts by mass cyclohexanone: 18.5 parts by mass Finally, 4 parts by mass of polyisocyanate (trade name: Coronate L, manufactured by Nippon Polyurethane Industry Co., Ltd.) as a curing agent and 2 parts by mass of stearic acid as lubricant were added to the underlayer forming paint prepared as described above.

(Step of Preparing Back Layer Forming Paint)

A back layer forming paint was prepared as follows. The following raw materials were mixed in a stirring tank equipped with a disper and subjected to filter treatment to prepare the back layer forming paint.

small particle diameter carbon black powder (average particle diameter (D50) 20 nm): 90 parts by mass large particle diameter carbon black powder (average particle diameter (D50) 270 nm): 10 parts by mass polyester polyurethane: 100 parts by mass (manufactured by Nippon Polyurethane Industry Co., Ltd., trade name: N-2304)

methyl ethyl ketone: 500 parts by mass toluene: 400 parts by mass cyclohexanone: 100 parts by mass (Applying Step)

An underlayer having an average thickness of 1.0 μm and a magnetic layer having an average thickness of 80 nm were formed in the following manner on one main surface of an elongated polyethylene naphthalate film (hereinafter referred to as "PEN film") having an average thickness of 4.12 μm, which is a nonmagnetic support, using the magnetic layer forming paint and the underlayer forming paint prepared as described above. First, the underlayer forming paint was applied onto one main surface of the PEN film to be dried to form the underlayer. Next, the magnetic layer forming paint was applied onto the underlayer and dried to form the magnetic layer. Note that when drying the magnetic layer forming paint, magnetic field orientation of the magnetic powder in the thickness direction of the film was performed by a solenoid coil. Furthermore, a drying condition (drying temperature and drying time) of the magnetic layer forming paint was adjusted, and a square ratio S1 and a square ratio S2 in a thickness direction (vertical direction) and in a longitudinal direction of a magnetic tape were set to values illustrated in Table 2. Subsequently, the back layer forming paint was applied onto the other main surface of the PEN film and dried to form the back layer having an average thickness of 0.4 μm. With this arrangement, the magnetic tape was obtained.

(Calendering Step, Transferring Step)

Subsequently, calender treatment was performed to smooth the surface of the magnetic layer. Next, the obtained magnetic tape was wound into a roll, and in this state, the magnetic tape was subjected to heat treatment at 60 degrees C. for 10 hours. Then, after re-winding the magnetic tape in a roll shape so that an end located on an inner peripheral side is located on an outer peripheral side, the heat treatment was performed again on the magnetic tape at 60 degrees C. for 10 hours in this state. With this arrangement, a large number of projections on a surface of the back layer were transferred to a surface of the magnetic layer, and a large number of holes were formed on the surface of the magnetic layer.

(Cutting Step)

The magnetic tape obtained as described above was cut into a width of ½ inch (12.65 mm). With this arrangement, a target elongated magnetic tape (average thickness: 5.6 μm) was obtained.

Example 5

A magnetic tape was obtained in a manner similar to that in the example 2 except that the magnetic tape was subjected to heat treatment at 60 degrees C. for 20 hours at a transferring step.

Example 6

A magnetic tape was obtained in a manner similar to that in the example 2 except that the magnetic tape was subjected to heat treatment at 70 degrees C. for 20 hours at a transferring step.

Example 7

A magnetic tape was obtained in a manner similar to that in the example 2 except that powder of strontium ferrite particles (hexagonal plate shape, aspect ratio 3.0, and particle volume 2000 nm$^3$) was used as magnetic powder at a preparing step of a magnetic layer forming paint.

Example 8

Powder (spherical shape, aspect ratio 1.1, and particle volume 2150 nm$^3$) of ε-iron oxide particles was used as magnetic powder at a step of preparing a magnetic layer forming paint. Furthermore, at an applying step, a drying condition was adjusted, and a square ratio S1 and a square ratio S2 in a thickness direction (vertical direction) and in a longitudinal direction of the magnetic tape were set to values illustrated in Table 2. The magnetic tape was obtained in a manner similar to that in the example 1 except for them.

Example 9

A magnetic tape was obtained in a manner similar to that in the example 8 except that powder of ε-iron oxide particles containing Ga (spherical shape, aspect ratio 1.1, and particle volume 2150 nm$^3$) was used as magnetic powder at a preparing step of a magnetic layer forming paint.

Example 10

A magnetic tape was obtained in a manner similar to that in the example 8 except that powder of ε-iron oxide particles containing Al (spherical shape, aspect ratio 1, particle volume 2150 nm$^3$) was used as magnetic powder at a preparing step of a magnetic layer forming paint.

Example 11

Powder (cubic shape, aspect ratio 1.7, and particle volume 2200 nm$^3$) of cobalt ferrite was used as magnetic powder at a step of preparing a magnetic layer forming paint. Furthermore, at an applying step, a drying condition was adjusted, and a square ratio S1 and a square ratio S2 in a thickness direction (vertical direction) and in a longitudinal direction of the magnetic tape were set to values illustrated in Table 2. The magnetic tape was obtained in a manner similar to that in the example 1 except for them.

Example 12

A magnetic tape was obtained in a manner similar to that in the example 2 except that a type and a formulation amount of inorganic particles were changed as follows at a preparing step of a back layer forming paint.
    small particle diameter carbon black powder (average particle diameter (D50) 20 nm): 80 parts by mass
    large particle diameter carbon black powder (average particle diameter (D50) 270 nm): 20 parts by mass Example 13

A magnetic tape was obtained in a manner similar to that in the example 2 except that an application amount of a back layer forming paint was adjusted so that an average thickness of the back layer was 0.5 μm.

Example 16

A type and a formulation amount of inorganic particles were changed as follows at a preparation step of a back layer forming paint.
    small particle diameter carbon black powder (average particle diameter (D50) 50 nm): 70 parts by mass
    large particle diameter carbon black powder (average particle diameter (D50) 270 nm): 30 parts by mass
Furthermore, at a transferring step, the magnetic tape was subjected to heat treatment at 80 degrees C. for 20 hours. The magnetic tape was obtained in a manner similar to that in the example 1 except for them.

Example 17

A magnetic tape was obtained in a manner similar to that in the example 1 except that square ratios S1 and S2 were set to values illustrated in Table 2 by increasing magnetic flux density of a solenoid for vertical orientation and adjusting drying time at an orientating step of a magnetic paint.

Example 18

A magnetic tape was obtained in a manner similar to that in the example 1 except that square ratios S1 and S2 were set to values illustrated in Table 2 by elongating dispersing time by a sand mill of a magnetic paint to use the paint with especially excellent paint dispersion state and by increasing magnetic flux density of a solenoid for vertical orientation at an orientating step of the magnetic paint.

Example 19

A magnetic tape was obtained in a manner similar to that in the example 1 except that square ratios S1 and S2 were set to values illustrated in Table 2 by elongating dispersing time by a sand mill of a magnetic paint to use the paint with especially excellent paint dispersion state, by increasing magnetic flux density of a solenoid for vertical orientation at an orientating step of the magnetic paint, and by adjusting drying time.

Example 20

A magnetic tape was obtained in a manner similar to that in the example 1 except that powder of hexagonal plate-shaped barium ferrite ($BaFe_{12}O_{19}$) particles was changed from that with an average aspect ratio of 2.8 and an average particle volume of 1950 $nm^3$ to that with an average aspect ratio of 2.5 and an average particle volume of 1600 $nm^3$.

Example 21

A magnetic tape was obtained in a manner similar to that in the example 1 except that powder of hexagonal plate-shape barium ferrite ($BaFe_{12}O_{19}$) particles was changed from that with an average aspect ratio of 2.8 and an average particle volume of 1950 $nm^3$ to that with an average aspect ratio of 2.3 and an average particle volume of 1300 $nm^3$.

Example 22

A magnetic tape having an average thickness of 4.3 μm was obtained in a manner similar to that in the example 17 except that an average thickness of a magnetic layer was changed to 60 nm, and an average thickness of a PEN film and an average thickness of an underlayer were changed.

Example 23

A magnetic tape having an average thickness of 4.3 μm was obtained in a manner similar to that in the example 18 except that an average thickness of a magnetic layer was changed to 40 nm, and an average thickness of a PEN film and an average thickness of an underlayer were changed.

Example 24

A magnetic tape was obtained in a manner similar to that in the example 1 except that powder of hexagonal plate-shaped barium ferrite ($BaFe_{12}O_{19}$) particles was changed from that with an average aspect ratio of 2.8 and an average particle volume of 1950 $nm^3$ to that with an average aspect ratio of 2.8 and an average particle volume of 2800 $nm^3$.

Example 25

A magnetic tape was obtained in a manner similar to that in the example 1 except that powder of hexagonal plate-shaped barium ferrite ($BaFe_{12}O_{19}$)) particles was changed from that with an average aspect ratio of 2.8 and an average particle volume of 1950 $nm^3$ to that with an average aspect ratio of 2.8 and an average particle volume of 2500 $nm^3$.

Comparative Example 1

A magnetic tape was obtained in a manner similar to that in the example 16 except that the magnetic tape was subjected to heat treatment at 60 degrees C. for 10 hours at a transferring step.

Comparative Example 2

A magnetic tape was obtained in a manner similar to that in the example 16 except that the magnetic tape was subjected to heat treatment at 50 degrees C. for 20 hours at a transferring step.

Comparative Example 3

A magnetic tape was obtained in a manner similar to that in the comparative example 1 except that a type and a formulation amount of inorganic particles were changed as follows at a preparing step of a back layer forming paint.
small particle diameter carbon black powder (average particle diameter (D50) 50 nm): 80 parts by mass
large particle diameter carbon black powder (average particle diameter (D50) 270 nm): 20 parts by mass Comparative Example 4

A magnetic tape was obtained in a manner similar to that in the comparative example 3 except that a type and a formulation amount of inorganic particles were changed as follows at a preparing step of a back layer forming paint.
small particle diameter carbon black powder (average particle diameter (D50) 50 nm): 90 parts by mass
large particle diameter carbon black powder (average particle diameter (D50) 270 nm): 10 parts by mass Comparative Example 5

A magnetic tape was obtained in a manner similar to that in the comparative example 3 except that a type and a formulation amount of inorganic particles were changed as follows at a preparing step of a back layer forming paint.
large particle diameter carbon black powder (average particle diameter (D50) 270 nm): 100 parts by mass

[Evaluation]

The following evaluations were performed on the magnetic tapes of examples 1 to 25 and comparative examples 1 to 5 obtained as described above.

(Friction Coefficient Ratio)

A friction coefficient ratio ($\mu_B/\mu_A$) between a dynamic friction coefficient $\mu_A$ between the surface of the magnetic layer and the magnetic head when tension applied to the magnetic tape is 1.2 N and a dynamic friction coefficient $\mu_B$ between the surface of the magnetic layer and the magnetic head when the tension applied to the magnetic tape is 0.4 N was obtained. Furthermore, regarding a dynamic friction coefficient $\mu_C$ between the surface of the magnetic layer and the magnetic head when the tension applied to the magnetic tape is 0.6 N, a friction coefficient ratio $(\mu_C(1000)/\mu_C(5))$ between a dynamic friction coefficient $\mu_C(5)$ in fifth travel and a value $\mu_C(1000)$ of 1000th travel was obtained.

Note that the dynamic friction coefficients $\mu_A$, $\mu_B$, $\mu_C(5)$, and $\mu_C(1000)$ were measured under the following conditions.

load: 60 gf
angle per head: 5.6°
head: LTO 5 head
sliding distance: 60 mm
sliding speed: 10 mm/sec
(SNR)

An electromagnetic conversion characteristic (SNR) of the magnetic tape in a 25 degrees C. environment was measured using a ½ inch tape traveling device (MTS Transport, manufactured by Mountain Engineering II, Inc.) equipped with a recording/reproducing head and a recording/reproducing amplifier. A ring head with a gap length of 0.2 μm was used as the recording head, and a GMR head with an inter-shield distance of 0.1 μm was used for as reproducing head. A relative speed was 6 m/s, a recording clock frequency was 160 MHz, and a recording track width was 2.0 μm. Furthermore, the SNR was calculated on the basis of the method disclosed in the following document. The results are illustrated in Table 2 as relative values with the SNR of the example 1 being 1 dB.

Y. Okazaki: "An Error Rate Emulation System.", IEEE Trans. Man., 31, pp. 3093-3095(1995)

Table 1 illustrates the type and formulation amount of inorganic particle powder included in the back layer forming paint, and conditions for transfer treatment.

TABLE 1

| | BACK LAYER | | | TRANSFERRING TREATMENT | |
|---|---|---|---|---|---|
| | SMALL PARTICLE (D50:20 nm) | SMALL PARTICLE (D50:50 nm) | LARGE PARTICLE (D50:270 nm) | TEMPERATURE [° C.] | TIME [TIME] |
| EXAMPLE 1 | 90 | 0 | 10 | 60 | 10 + 10 |
| EXAMPLE 2 | 90 | 0 | 10 | 60 | 10 + 10 |
| EXAMPLE 3 | 90 | 0 | 10 | 60 | 10 + 10 |
| EXAMPLE 4 | 90 | 0 | 10 | 60 | 10 + 10 |
| EXAMPLE 5 | 90 | 0 | 10 | 60 | 20 |
| EXAMPLE 6 | 90 | 0 | 10 | 70 | 20 |
| EXAMPLE 7 | 90 | 0 | 10 | 60 | 10 + 10 |
| EXAMPLE 8 | 90 | 0 | 10 | 60 | 10 + 10 |
| EXAMPLE 9 | 90 | 0 | 10 | 60 | 10 + 10 |
| EXAMPLE 10 | 90 | 0 | 10 | 60 | 10 + 10 |
| EXAMPLE 11 | 90 | 0 | 10 | 60 | 10 + 10 |
| EXAMPLE 12 | 80 | 0 | 20 | 60 | 10 + 10 |
| EXAMPLE 13 | 90 | 0 | 10 | 60 | 10 + 10 |
| EXAMPLE 14 | 90 | 0 | 10 | 60 | 10 + 10 |
| EXAMPLE 15 | 90 | 0 | 10 | 60 | 10 + 10 |
| EXAMPLE 16 | 0 | 70 | 30 | 80 | 20 |
| EXAMPLE 17 | 90 | 0 | 10 | 60 | 10 + 10 |
| EXAMPLE 18 | 90 | 0 | 10 | 60 | 10 + 10 |
| EXAMPLE 19 | 90 | 0 | 10 | 60 | 10 + 10 |
| EXAMPLE 20 | 90 | 0 | 10 | 60 | 10 + 10 |
| EXAMPLE 21 | 90 | 0 | 10 | 60 | 10 + 10 |
| EXAMPLE 22 | 90 | 0 | 10 | 60 | 10 + 10 |
| EXAMPLE 23 | 90 | 0 | 10 | 60 | 10 + 10 |
| EXAMPLE 24 | 90 | 0 | 10 | 60 | 10 + 10 |
| EXAMPLE 25 | 90 | 0 | 10 | 60 | 10 + 10 |
| COMPARATIVE EXAMPLE 1 | 90 | 0 | 10 | 60 | 10 |
| COMPARATIVE EXAMPLE 2 | 90 | 0 | 10 | 50 | 20 |
| COMPARATIVE EXAMPLE 3 | 0 | 80 | 20 | 60 | 10 |
| COMPARATIVE EXAMPLE 4 | 0 | 90 | 10 | 60 | 10 |
| COMPARATIVE EXAMPLE 5 | 100 | 0 | 0 | 60 | 10 + 10 |

D50: N DIAMETER

Table 2 illustrates a configuration of the magnetic tape and the evaluation results.

TABLE 2

| | VERTICAL SQUARE RATIO (WITHOUT DEMAGNETIZING FIELD CORRECTION) [%] | LONGITUDINAL SQUARE RATIO [%] | PORE VOLUME [cm³/g] | PORE DIAMETER OF MAXIMUM PORE VOLUME AT DESORPTION [nm] | BET SPECIFIC SURFACE AREA [m²/mg] | MAGNETIC POWDER |
|---|---|---|---|---|---|---|
| EXAMPLE 1 | 65 | 35 | 0.020 | 8 | 4 | $BaFe_{12}O_{19}$ |
| EXAMPLE 2 | 66 | 30 | 0.020 | 8 | 4 | $BaFe_{12}O_{19}$ |
| EXAMPLE 3 | 71 | 29 | 0.020 | 8 | 4 | $BaFe_{12}O_{19}$ |
| EXAMPLE 4 | 70 | 25 | 0.020 | 8 | 4 | $BaFe_{12}O_{19}$ |
| EXAMPLE 5 | 66 | 30 | 0.020 | 8 | 4.5 | $BaFe_{12}O_{19}$ |
| EXAMPLE 6 | 66 | 30 | 0.020 | 8 | 5 | $BaFe_{12}O_{19}$ |
| EXAMPLE 7 | 66 | 30 | 0.020 | 8 | 4 | $SrFe_{12}O_{19}$ |
| EXAMPLE 8 | 66 | 30 | 0.020 | 8 | 4 | ε-IRON OXIDE |
| EXAMPLE 9 | 66 | 30 | 0.020 | 8 | 4 | ε-IRON OXIDE (CONTAINING Ga) |
| EXAMPLE 10 | 66 | 30 | 0.020 | 8 | 4 | ε-IRON OXIDE (CONTAINING Al) |
| EXAMPLE 11 | 66 | 30 | 0.020 | 8 | 4 | Co-IRON OXIDE |
| EXAMPLE 12 | 66 | 30 | 0.023 | 9 | 4 | $BaFe_{12}O_{19}$ |
| EXAMPLE 13 | 66 | 30 | 0.020 | 10 | 4 | $BaFe_{12}O_{19}$ |
| EXAMPLE 14 | 55 | 46 | 0.020 | 8 | 4 | $BaFe_{12}O_{19}$ |
| EXAMPLE 15 | 61 | 40 | 0.020 | 8 | 4 | $BaFe_{12}O_{19}$ |
| EXAMPLE 16 | 66 | 31 | 0.020 | 12 | 6 | $BaFe_{12}O_{19}$ |
| EXAMPLE 17 | 75 | 23 | 0.020 | 8 | 4 | $BaFe_{12}O_{19}$ |
| EXAMPLE 18 | 80 | 21 | 0.020 | 8 | 3.9 | $BaFe_{12}O_{19}$ |
| EXAMPLE 19 | 85 | 18 | 0.020 | 8 | 3.8 | $BaFe_{12}O_{19}$ |
| EXAMPLE 20 | 65 | 35 | 0.020 | 7 | 4 | $BaFe_{12}O_{19}$ |
| EXAMPLE 21 | 65 | 35 | 0.020 | 6 | 4 | $BaFe_{12}O_{19}$ |
| EXAMPLE 22 | 75 | 23 | 0.020 | 8 | 3.9 | $BaFe_{12}O_{19}$ |
| EXAMPLE 23 | 80 | 20 | 0.020 | 8 | 3.8 | $BaFe_{12}O_{19}$ |
| EXAMPLE 24 | 65 | 35 | 0.020 | 8 | 4 | $BaFe_{12}O_{19}$ |
| EXAMPLE 25 | 65 | 35 | 0.020 | 8 | 4 | $BaFe_{12}O_{19}$ |
| COMPARATIVE EXAMPLE 1 | 66 | 31 | 0.020 | 8 | 3 | $BaFe_{12}O_{19}$ |
| COMPARATIVE EXAMPLE 2 | 66 | 31 | 0.020 | 8 | 2 | $BaFe_{12}O_{19}$ |
| COMPARATIVE EXAMPLE 3 | 66 | 31 | 0.018 | 8 | 3 | $BaFe_{12}O_{19}$ |
| COMPARATIVE EXAMPLE 4 | 66 | 31 | 0.015 | 8 | 2.5 | $BaFe_{12}O_{19}$ |
| COMPARATIVE EXAMPLE 5 | 66 | 31 | 0.015 | 5 | 2 | $BaFe_{12}O_{19}$ |

| | FRICTIONAL COEFFICIENT RATIO (μB/μA) | FRICTIONAL COEFFICIENT RATIO (μC (1000)/ μC(5)) | SNR CHARACTERISTIC | SHAPE | AVERAGE ASPECT RATIO | PARTICLE VOLUME [nm³] |
|---|---|---|---|---|---|---|
| EXAMPLE 1 | 1.2 | 1.2 | 1 | PLATE SHAPE | 2.8 | 1950 |
| EXAMPLE 2 | 1.2 | 1.2 | 1.2 | PLATE SHAPE | 2.8 | 1950 |
| EXAMPLE 3 | 1.2 | 1.3 | 1.4 | PLATE SHAPE | 2.8 | 1950 |
| EXAMPLE 4 | 1.2 | 1.2 | 1.5 | PLATE SHAPE | 2.8 | 1950 |
| EXAMPLE 5 | 1.2 | 1.2 | 1.1 | PLATE SHAPE | 2.8 | 1950 |
| EXAMPLE 6 | 1.2 | 1.3 | 1.1 | PLATE SHAPE | 2.8 | 1950 |
| EXAMPLE 7 | 1.2 | 1.2 | 1.1 | PLATE SHAPE | 3.0 | 2000 |
| EXAMPLE 8 | 1.2 | 1.3 | 1.2 | SPHERICAL SHAPE | 1.1 | 2150 |
| EXAMPLE 9 | 1.2 | 1.2 | 1.2 | SPHERICAL SHAPE | 1.1 | 2150 |
| EXAMPLE 10 | 1.2 | 1.2 | 1.1 | SPHERICAL SHAPE | 1.0 | 2150 |
| EXAMPLE 11 | 1.2 | 1.2 | 1.3 | CUBIC SHAPE | 1.7 | 2200 |
| EXAMPLE 12 | 1.2 | 1.1 | 1.2 | PLATE SHAPE | 2.8 | 1950 |
| EXAMPLE 13 | 1.2 | 1 | 1.2 | PLATE SHAPE | 2.8 | 1950 |

TABLE 2-continued

| | | | | | | |
|---|---|---|---|---|---|---|
| EXAMPLE 14 | 1.2 | 1.1 | 0.1 | PLATE SHAPE | 2.8 | 1950 |
| EXAMPLE 15 | 1.2 | 1.2 | 0.2 | PLATE SHAPE | 2.8 | 1950 |
| EXAMPLE 16 | 2.1 | 1.9 | 1.1 | PLATE SHAPE | 2.8 | 1950 |
| EXAMPLE 17 | 1.2 | 1.2 | 1.6 | PLATE SHAPE | 2.8 | 1950 |
| EXAMPLE 18 | 1.2 | 1.2 | 1.9 | PLATE SHAPE | 2.8 | 1950 |
| EXAMPLE 19 | 1.2 | 1.2 | 2.2 | PLATE SHAPE | 2.8 | 1950 |
| EXAMPLE 20 | 1.2 | 1.2 | 1.8 | PLATE SHAPE | 2.5 | 1600 |
| EXAMPLE 21 | 1.2 | 1.4 | 2.2 | PLATE SHAPE | 2.3 | 1300 |
| EXAMPLE 22 | 1.4 | 1.5 | 1.6 | PLATE SHAPE | 2.8 | 1950 |
| EXAMPLE 23 | 1.6 | 1.6 | 1.6 | PLATE SHAPE | 2.8 | 1950 |
| EXAMPLE 24 | 1.2 | 1.1 | −0.7 | PLATE SHAPE | 2.8 | 2800 |
| EXAMPLE 25 | 1.2 | 1.1 | −0.3 | PLATE SHAPE | 2.8 | 2500 |
| COMPARATIVE EXAMPLE 1 | 2.2 | 2.3 | 1 | PLATE SHAPE | 2.8 | 1950 |
| COMPARATIVE EXAMPLE 2 | 2.3 | 2.5 | 1.1 | PLATE SHAPE | 2.8 | 1950 |
| COMPARATIVE EXAMPLE 3 | 2.2 | 2 | 1 | PLATE SHAPE | 2.8 | 1950 |
| COMPARATIVE EXAMPLE 4 | 2.2 | 2.2 | 1.1 | PLATE SHAPE | 2.8 | 1950 |
| COMPARATIVE EXAMPLE 5 | 2.2 | 2.3 | 1 | PLATE SHAPE | 2.8 | 1950 |

| | AVERAGE PARTICLE SIZE [nm] | MAGNETIC LAYER AVERAGE THICKNESS [nm] | TAPE AVERAGE THICKNESS [μm] | MAGNETIC LAYER Ra [μm] |
|---|---|---|---|---|
| EXAMPLE 1 | 20.3 | 80 | 5.6 | 2.5 OR SMALLER |
| EXAMPLE 2 | 20.3 | 80 | 5.6 | 2.5 OR SMALLER |
| EXAMPLE 3 | 20.3 | 80 | 5.6 | 2.5 OR SMALLER |
| EXAMPLE 4 | 20.3 | 80 | 5.6 | 2.5 OR SMALLER |
| EXAMPLE 5 | 20.3 | 80 | 5.6 | 2.5 OR SMALLER |
| EXAMPLE 6 | 20.3 | 80 | 5.6 | 2.5 OR SMALLER |
| EXAMPLE 7 | 21.3 | 80 | 5.6 | 2.5 OR SMALLER |
| EXAMPLE 8 | 16 | 80 | 5.6 | 2.5 OR SMALLER |
| EXAMPLE 9 | 16 | 80 | 5.6 | 2.5 OR SMALLER |
| EXAMPLE 10 | 16 | 80 | 5.6 | 2.5 OR SMALLER |
| EXAMPLE 11 | 18.5 | 80 | 5.6 | 2.5 OR SMALLER |
| EXAMPLE 12 | 20.3 | 80 | 5.6 | 2.5 OR SMALLER |
| EXAMPLE 13 | 20.3 | 80 | 5.6 | 2.5 OR SMALLER |
| EXAMPLE 14 | 20.3 | 80 | 5.6 | 2.5 OR SMALLER |
| EXAMPLE 15 | 20.3 | 80 | 5.6 | 2.5 OR SMALLER |
| EXAMPLE 16 | 20.3 | 80 | 5.6 | 2.5 OR SMALLER |
| EXAMPLE 17 | 20.3 | 80 | 5.6 | 2.5 OR SMALLER |
| EXAMPLE 18 | 20.3 | 80 | 5.6 | 2.5 OR SMALLER |
| EXAMPLE 19 | 20.3 | 80 | 5.6 | 2.5 OR SMALLER |

TABLE 2-continued

| EXAMPLE 20 | 19 | 80 | 5.6 | 2.5 OR SMALLER |
| --- | --- | --- | --- | --- |
| EXAMPLE 21 | 17 | 80 | 5.6 | 2.5 OR SMALLER |
| EXAMPLE 22 | 20.3 | 60 | 4.3 | 2.5 OR SMALLER |
| EXAMPLE 23 | 20.3 | 40 | 4.3 | 2.5 OR SMALLER |
| EXAMPLE 24 | 25 | 80 | 5.6 | 2.5 OR SMALLER |
| EXAMPLE 25 | 23 | 80 | 5.6 | 2.5 OR SMALLER |
| COMPARATIVE EXAMPLE 1 | 20.3 | 80 | 5.6 | 2.5 OR SMALLER |
| COMPARATIVE EXAMPLE 2 | 20.3 | 80 | 5.6 | 2.5 OR SMALLER |
| COMPARATIVE EXAMPLE 3 | 20.3 | 80 | 5.6 | 2.5 OR SMALLER |
| COMPARATIVE EXAMPLE 4 | 20.3 | 80 | 5.6 | 2.5 OR SMALLER |
| COMPARATIVE EXAMPLE 5 | 20.3 | 80 | 5.6 | 2.5 OR SMALLER |

The following is found from Tables 1 and 2.

In the examples 1 to 25, since the BET specific surface area is 3.5 $m^2$/mg or larger, the increase in the friction coefficient ratio may be suppressed even after the recording or the reproduction is repeatedly performed on the magnetic tape the surface of the magnetic layer of which is smoothed. In contrast, in the comparative examples 1 to 5, since the BET specific surface area is 3.5 $m^2$/mg or smaller, there is difficulty in suppressing the increase in the friction coefficient ratio after the recording or the reproduction is repeatedly performed on the magnetic tape the surface of the magnetic layer of which is smoothed.

In the examples 1 to 13 and 16 to 23, since the square ratio S1 in the vertical direction (thickness direction) of the magnetic tape is 65% or larger, an excellent SNR is obtained.

In the example 16, since the BET specific surface area is 6 $m^2$/mg and is a little bit higher, the friction coefficient ratio tends to slightly increase as compared with that in the example 1 and the like. This is thought to be because the lubricant is excessively supplied to the surface of the magnetic tape, and the lubricant additionally adheres to the head surface by this excessive supply, so that the friction coefficient slightly increases in travel by about 50 times.

Although the embodiments and the variations thereof of the present disclosure are specifically described above, the present disclosure is not limited to the above-described embodiments and variations and various modifications based on the technical idea of the present disclosure may be made.

For example, the configuration, method, step, shape, material, numerical value and the like described in the above-described embodiments and variations are merely examples, and the configuration, method, step, shape, material, numerical value and the like different from those may also be used as necessary. Furthermore, the chemical formulae of compounds and the like are representative and are not limited to the listed valences and the like as long as they are common names of the same compound.

Furthermore, the configuration, method, step, shape, material, numerical value and the like of the above-described embodiments and variations thereof may be combined with one another within the gist of the present disclosure.

Furthermore, in the present specification, a numerical value range indicated by using "to" indicates a range including numerical values described before and after "to" as the minimum value and the maximum value, respectively. In the numerical value range described in stages in the present specification, an upper limit value or a lower limit value of a numerical value range of a certain stage may be replaced with the upper limit value or the lower limit value of the numerical value range of another stage. The materials exemplified in the present specification may be used alone or in combination of two or larger unless otherwise specified.

Furthermore, the present disclosure may also adopt the following configurations.

(1)

A tape-shaped magnetic recording medium including:

a base; and a magnetic layer provided on the base and including lubricant, in which the magnetic layer includes a surface provided with a large number of holes, arithmetic average roughness Ra of the surface is 2.5 nm or smaller, and a BET specific surface area of a whole of the magnetic recording medium in a state in which the lubricant is removed is 3.5 $m^2$/mg or larger.

(2)

The magnetic recording medium according to (1), in which the BET specific surface area is 4 $m^2$/mg or larger.

(3)

The magnetic recording medium according to (1) or (2), in which the BET specific surface area is 6 $m^2$/mg or smaller.

(4)

The magnetic recording medium according to any one of (1) to (3), in which an average pore diameter of the whole of the magnetic recording medium obtained by a BJH method is 6 nm or larger and 11 nm or smaller.

(5)

The magnetic recording medium according to any one of (1) to (4), in which a square ratio in a vertical direction is 65% or larger.

(6)

The magnetic recording medium according to any one of (1) to (5), in which a square ratio in a longitudinal direction is 35% or smaller.

(7)

The magnetic recording medium according to any one of (1) to (6), in which coercive force Hc in the longitudinal direction is 2000 Oe or smaller.

(8)

The magnetic recording medium according to any one of (1) to (7), in which the magnetic layer includes five or more servo bands.

(9)

The magnetic recording medium according to (8), in which a ratio of a total area of the servo bands to an area of the surface is 4.0% or smaller.

(10)

The magnetic recording medium according to (8) or (9), in which a width of each of the servo bands is 95 μm or smaller.

(11)

The magnetic recording medium according to any one of (1) to (10), in which the magnetic layer is configured to be able to form a plurality of data tracks, and a width of each of the data tracks is 2.0 μm or smaller.

(12)

The magnetic recording medium according to any one of (1) to (11), in which the magnetic layer is configured to be able to record data such that a minimum value of a magnetization inversion distance L is 48 nm or smaller.

(13)

The magnetic recording medium according to any one of (1) to (12), in which an average thickness of the magnetic layer is 90 nm or smaller, and an average thickness of the magnetic recording medium is 5.6 μm or smaller.

(14)

The magnetic recording medium according to any one of (1) to (13), in which an average thickness of the base is 4.2 μm or smaller.

(15)

The magnetic recording medium according to any one of (1) to (14), in which a friction coefficient ratio ($\mu_B/\mu_A$) between a dynamic friction coefficient $\mu_A$ between the surface and a magnetic head when tension applied to the magnetic recording medium is 1.2 N and a dynamic friction coefficient $\mu_B$ between the surface and the magnetic head when tension applied to the magnetic recording medium is 0.4 N is 1.0 or larger and 2.0 or smaller.

(16)

The magnetic recording medium according to any one of (1) to (15), in which the magnetic layer includes magnetic powder, and the magnetic powder includes hexagonal ferrite, ε-iron oxide, or Co-containing spinel ferrite.

(17)

The magnetic recording medium according to (16), in which an average aspect ratio of the magnetic powder is 1 or larger and 2.5 or smaller.

(18)

The magnetic recording medium according to (16) or (17), in which the hexagonal ferrite includes at least one of Ba or Sr, and the ε-iron oxide includes at least one of Al or Ga.

(19)

The magnetic recording medium according to any one of (1) to (18), in which the lubricant includes a compound represented by following general formula (1) and a compound represented by following general formula (2):

$$CH_3(CH_2)_n COOH \qquad (1)$$

(where, in general formula (1) described above, n is an integer selected from a range of 14 or larger and 22 or smaller); and

$$CH_3(CH_2)_p COO(CH_2)_q CH_3 \qquad (2)$$

(where, in general formula (2) described above, p is an integer selected from a range of 14 or larger and 22 or smaller, and q is an integer selected from a range of 2 or larger and 5 or smaller).

(20)

A tape-shaped magnetic recording medium including:

a surface on which a magnetic head travels, in which the surface includes a large number of holes and includes lubricant, arithmetic average roughness Ra of the surface is 2.5 nm or smaller, and a BET specific surface area of a whole of the magnetic recording medium in a state in which the lubricant is removed is 3.5 m²/mg or larger.

Furthermore, the present disclosure may also adopt the following configurations.

(21)

A tape-shaped magnetic recording medium including:

a base;

an underlayer provided on the base; and a magnetic layer provided on the underlayer and including magnetic powder including hexagonal ferrite, in which the underlayer and the magnetic layer include lubricant, the magnetic layer includes a surface provided with a large number of holes, arithmetic average roughness Ra of the surface is 2.5 nm or smaller, a BET specific surface area of a whole of the magnetic recording medium in a state in which the lubricant is removed is 3.5 m²/mg or larger, a square ratio in a vertical direction is 65% or larger, an average thickness of the magnetic layer is 90 nm or smaller, and an average thickness of the magnetic recording medium is 5.6 μm or smaller.

(22)

The magnetic recording medium according to (21), in which the BET specific surface area is 4 m²/mg or larger.

(23)

The magnetic recording medium according to (21) or (22), in which the BET specific surface area is 6 m²/mg or smaller.

(24)

The magnetic recording medium according to any one of (21) to (23), in which an average pore diameter of a whole of the magnetic recording medium obtained by a BJH method is 6 nm or larger and 11 nm or smaller.

(25)

The magnetic recording medium according to any one of (21) to (24), in which a square ratio in a longitudinal direction is 35% or smaller.

(26)

The magnetic recording medium according to any one of (21) to (25), in which the square ratio in the vertical direction is 75% or larger.

(27)
The magnetic recording medium according to any one of (21) to (26), in which coercive force Hc in the longitudinal direction is 2000 Oe or smaller.

(28)
The magnetic recording medium according to any one of (21) to (27), in which the magnetic layer includes five or more servo bands.

(29)
The magnetic recording medium according to (28), in which a ratio of a total area of the servo bands to an area of the surface is 4.0% or smaller.

(30)
The magnetic recording medium according to (28) or (29), in which a width of each of the servo bands is 95 μm or smaller.

(31)
The magnetic recording medium according to any one of (21) to (31),
in which the magnetic layer is configured to be able to form a plurality of data tracks, and
a width of each of the data tracks is 2.0 μm or smaller.

(32)
The magnetic recording medium according to any one of (21) to (31), in which the magnetic layer is configured to be able to record data such that a minimum value of a magnetization inversion distance L is 48 nm or smaller.

(33)
The magnetic recording medium according to any one of (21) to (32), in which an average thickness of the base is 4.2 μm or smaller.

(34)
The magnetic recording medium according to any one of (21) to (33), in which a friction coefficient ratio ($\mu_B/\mu_A$) between a dynamic friction coefficient $\mu_A$ between the surface and a magnetic head when tension applied to the magnetic recording medium is 1.2 N and a dynamic friction coefficient $\mu_B$ between the surface and the magnetic head when tension applied to the magnetic recording medium is 0.4 N is 1.0 or larger and 2.0 or smaller.

(35)
The magnetic recording medium according to any one of (21) to (34), in which an average aspect ratio of the magnetic powder is 1 or larger and 2.5 or smaller.

(36)
The magnetic recording medium according to any one of (21) to (35), in which the hexagonal ferrite includes at least one of Ba or Sr.

(37)
The magnetic recording medium according to any one of (21) to (36), in which an average particle size of the magnetic powder is 50 nm or smaller.

(38)
The magnetic recording medium according to any one of (21) to (37),
in which the lubricant includes a compound represented by following general formula (1) and a compound represented by following general formula (2):

$$CH_3(CH_2)_n COOH \quad (1)$$

(where, in general formula (1) described above, n is an integer selected from a range of 14 or larger and 22 or smaller); and $$CH_3(CH_2)_p COO(CH_2)_q CH_3 \quad (2)$$

(where, in general formula (2) described above, p is an integer selected from a range of 14 or larger and 22 or smaller, and q is an integer selected from a range of 2 or larger and 5 or smaller).

(39)
The magnetic recording medium according to any one of (21) to (38), in which the underlayer includes a large number of holes, and the hole of the magnetic layer and the hole of the underlayer are connected.

(40)
A tape-shaped magnetic recording medium including:
a base; and
a magnetic layer provided on the base and including lubricant,
in which the magnetic layer includes a surface provided with a large number of holes,
arithmetic average roughness Ra of the surface is 2.5 nm or smaller, and
a BET specific surface area of a whole of the magnetic recording medium in a state in which the lubricant is removed is 3.5 m²/mg or larger.

(41)
The magnetic recording medium according to (40),
in which the magnetic layer includes magnetic powder, and
the magnetic powder includes hexagonal ferrite, ε-iron oxide, or Co-containing spinel ferrite.

(42)
The magnetic recording medium according to (41),
in which the hexagonal ferrite includes at least one of Ba or Sr, and
the ε-iron oxide includes at least one of Al or Ga.

(43)
A tape-shaped magnetic recording medium including:
a surface on which a magnetic head travels,
in which the surface includes a large number of holes and includes lubricant,
arithmetic average roughness Ra of the surface is 2.5 nm or smaller, and
a BET specific surface area of a whole of the magnetic recording medium in a state in which the lubricant is removed is 3.5 m²/mg or larger.

REFERENCE SIGNS LIST

10 Magnetic recording medium
10A Magnetic recording medium cartridge
10B Cartridge case
10C Reel
11 Base
12 Underlayer
13 Magnetic layer
13A Hole
14 Back layer
14A Projection
15 Barrier layer
21 Core
22 Shell
22a First shell
22b Second shell
30 Recording/reproducing device
31 Spindle
32 Reel
33 Spindle driving device
34 Reel driving device
35 Guide roller
36 Head unit 37 Communication interface
38 Control device
41 Server
42 Personal computer
43 Network

The invention claimed is:

1. A tape-shaped magnetic recording medium comprising:
a base;
an underlayer provided on the base; and
a magnetic layer provided on the underlayer and including magnetic powder including hexagonal ferrite,
wherein the underlayer and the magnetic layer include a lubricant,
the magnetic layer includes a surface provided with a large number of holes,
arithmetic average roughness Ra of the surface is 2.5 nm or smaller,
a BET specific surface area of a whole of the tape-shaped magnetic recording medium in a state in which the lubricant is removed is 3.5 m²/mg or larger and 5.5 m²/mg or less,
a square ratio in a vertical direction is 65% or larger,
an average thickness of the magnetic layer is 90 nm or smaller, and
an average thickness of the tape-shaped magnetic recording medium is 5.6 μm or smaller.

2. The tape-shaped magnetic recording medium according to claim 1, wherein the BET specific surface area is 4 m²/mg or larger.

3. The tape-shaped magnetic recording medium according to claim 1, wherein an average pore diameter of the whole of the tape-shaped magnetic recording medium obtained by a BJH method is 6 nm or larger and 11 nm or smaller.

4. The tape-shaped magnetic recording medium according to claim 1, wherein a square ratio in a longitudinal direction is 35% or smaller.

5. The tape-shaped magnetic recording medium according to claim 1, wherein the square ratio in the vertical direction is 75% or larger.

6. The tape-shaped magnetic recording medium according to claim 1, wherein coercive force Hc in a longitudinal direction is 2000 Oe or smaller.

7. The tape-shaped magnetic recording medium according to claim 1, wherein the magnetic layer has five or more servo bands.

8. The tape-shaped magnetic recording medium according to claim 7, wherein a ratio of a total area of the servo bands to the area of the surface is 4.0% or smaller.

9. The tape-shaped magnetic recording medium according to claim 8, wherein a width of each of the servo bands is 95 μm or smaller.

10. The tape-shaped magnetic recording medium according to claim 1,
wherein the magnetic layer is configured to be able to form a plurality of data tracks, and
a width of each of the data tracks is 2.0 μm or smaller.

11. The tape-shaped magnetic recording medium according to claim 1, wherein the magnetic layer is configured to be able to record data such that a minimum value of a magnetization inversion distance L is 48 nm or smaller.

12. The tape-shaped magnetic recording medium according to claim 1, wherein an average thickness of the base is 4.2 μm or smaller.

13. The tape-shaped magnetic recording medium according to claim 1, wherein a friction coefficient ratio ($\mu_B/\mu_A$) between a dynamic friction coefficient $\mu_A$ between the surface and a magnetic head when tension applied to the tape-shaped magnetic recording medium is 1.2 N and a dynamic friction coefficient $\mu_B$ between the surface and the magnetic head when tension applied to the tape-shaped magnetic recording medium is 0.4 N is 1.0 or larger and 2.0 or smaller.

14. The tape-shaped magnetic recording medium according to claim 1, wherein an average aspect ratio of the magnetic powder is 1 or larger and 2.5 or smaller.

15. The tape-shaped magnetic recording medium according to claim 1, wherein the hexagonal ferrite includes at least one of Ba or Sr.

16. The tape-shaped magnetic recording medium according to claim 1, wherein an average particle size of the magnetic powder is 50 nm or smaller.

17. The tape-shaped magnetic recording medium according to claim 1,
wherein the lubricant includes a compound represented by following general formula (1) and a compound represented by following general formula (2)

$$CH_3(CH_2)_nCOOH \quad (1):$$

where, in general formula (1) described above, n is an integer selected from a range of 14 or larger and 22 or smaller; and $$CH_3(CH_2)_pCOO(CH_2)_qCH_3 \quad (2)$$

where, in general formula (2) described above, p is an integer selected from a range of 14 or larger and 22 or smaller, and q is an integer selected from a range of 2 or larger and 5 or smaller.

18. The tape-shaped magnetic recording medium according to claim 1, wherein
the underlayer includes a large number of holes, and
the hole of the magnetic layer and the hole of the underlayer are connected.

* * * * *